(12) United States Patent
Xiong et al.

(10) Patent No.: US 12,010,540 B2
(45) Date of Patent: Jun. 11, 2024

(54) COVERAGE FOR PHYSICAL RANDOM ACCESS CHANNEL AND REPETITION OF CSI REPORT ON PUSCH FOR COVERAGE ENHANCEMENT

(71) Applicant: Intel Corporation, Santa Clara, CA (US)

(72) Inventors: Gang Xiong, Portland, OR (US); Sergey Sosnin, Zavolzhie (RU); Debdeep Chatterjee, San Jose, CA (US); Sergey Panteleev, Nizhny Novgorod (RU); Jie Zhu, San Jose, CA (US); Gregory Ermolaev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 179 days.

(21) Appl. No.: 17/502,853

(22) Filed: Oct. 15, 2021

(65) Prior Publication Data
US 2022/0038935 A1 Feb. 3, 2022

Related U.S. Application Data

(60) Provisional application No. 63/092,395, filed on Oct. 15, 2020, provisional application No. 63/092,356, filed on Oct. 15, 2020.

(51) Int. Cl.
*H04W 24/10* (2009.01)
*H04W 74/0833* (2024.01)

(52) U.S. Cl.
CPC ........ *H04W 24/10* (2013.01); *H04W 74/0833* (2013.01)

(58) Field of Classification Search
CPC .......................... H04W 24/10; H04W 74/0833
See application file for complete search history.

(56) References Cited

U.S. PATENT DOCUMENTS

| 2019/0165847 A1* | 5/2019 | Kim ................... H04L 25/0224 |
| 2020/0259625 A1* | 8/2020 | Papasakellariou ... H04B 7/0456 |
| 2021/0194556 A1* | 6/2021 | Ly ........................ H04L 5/0094 |

OTHER PUBLICATIONS

3GPP, "Technical Specification Group Radio Access Network; NR; Physical layer procedures for data (Release 16)," 3GPP TS 38.214 V16.3.0 (Sep. 2020), 5G, 166 pages.
3GPP, "Technical Specification Group Radio Access Network; NR; Physical layer procedures for control (Release 16)," 3GPP TS 38.213 V16.3.0 (Sep. 2020), 5G, 179 pages.
3GPP, "Technical Specification Group Radio Access Network; NR; Multiplexing and channel coding (Release 16)," 3GPP TS 38.212 V16.3.0 (Sep. 2020), 5G, 152 pages.
3GPP, "Technical Specification Group Radio Access Network; NR; Medium Access Control (MAC) protocol specification (Release 16)," 3GPP TS 38.321 V16.2.0 (Sep. 2020), 5G, 154 pages.

* cited by examiner

*Primary Examiner* — Duc C Ho
(74) *Attorney, Agent, or Firm* — Schwabe, Williamson & Wyatt, P.C.

(57) ABSTRACT

Various embodiments herein provide techniques for improving coverage for a physical random access channel (PRACH). Additionally, embodiments provide techniques for repetition of a channel state information (CSI) report on a physical uplink shared channel (PUSCH) for coverage enhancement. Other embodiments may be described and claimed.

20 Claims, 19 Drawing Sheets

--- receiving, from a gNB, configuration information to indicate a repetition window for a PRACH, wherein the repetition window includes a plurality of PRACH occasions
1602

↓ encoding a PRACH message for transmission with repetition in the respective PRACH occasions
1604 receiving, from a gNB, configuration information to indicate a repetition window for a PRACH, wherein the repetition window includes a plurality of PRACH occasions
1602 encoding a PRACH message for transmission with repetition in the respective PRACH occasions
1604

Figure 16 receiving configuration information to configure repetitions of a CSI report on a PUSCH, wherein the CSI report includes an A-CSI report or a SP-CSI report
1802 receiving a DCI to trigger the A-CSI report or activate the SP-CSI report
1804 encoding, for transmission on the PUSCH, the CSI report with repetitions based on the configuration information and the DCI
1806

Figure 18

COVERAGE FOR PHYSICAL RANDOM ACCESS CHANNEL AND REPETITION OF CSI REPORT ON PUSCH FOR COVERAGE ENHANCEMENT

CROSS REFERENCE TO RELATED APPLICATION

The present application claims priority to U.S. Provisional Patent Application No. 63/092,395, which was filed Oct. 15, 2020; U.S. Provisional Patent Application No. 63/092,356, which was filed Oct. 15, 2020; the disclosures of which are hereby incorporated by reference.

FIELD

Various embodiments generally may relate to the field of wireless communications. For example, some embodiments may relate to improving coverage for a physical random access channel and/or repetition of a channel state information (CSI) report on a physical uplink shared channel (PUSCH) for coverage enhancement.

BACKGROUND

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP Long Term Evolution (LTE)-Advanced with additional potential new Radio Access Technologies (RATs) to enrich people lives with better, simple and seamless wireless connectivity solutions. NR will enable everything connected by wireless and deliver fast, rich contents and services.

For cellular system, coverage is an important factor for successful operation. Compared to LTE, NR can be deployed at relatively higher carrier frequency in frequency range 1 (FR1), e.g., at 3.5 GHz. In this case, coverage loss is expected due to larger path-loss, which makes it more challenging to maintain an adequate quality of service. Typically, uplink coverage is the bottleneck for system operation considering the low transmit power at the user equipment (UE) side.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 16-19 illustrate processes to practice various embodiments herein.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Various embodiments herein provide techniques for improving coverage for a physical random access channel (PRACH). Additionally, embodiments provide techniques for repetition of a channel state information (CSI) report on a physical uplink shared channel (PUSCH) for coverage enhancement.

Improving Coverage for Physical Random Access Channel

Figure 1:
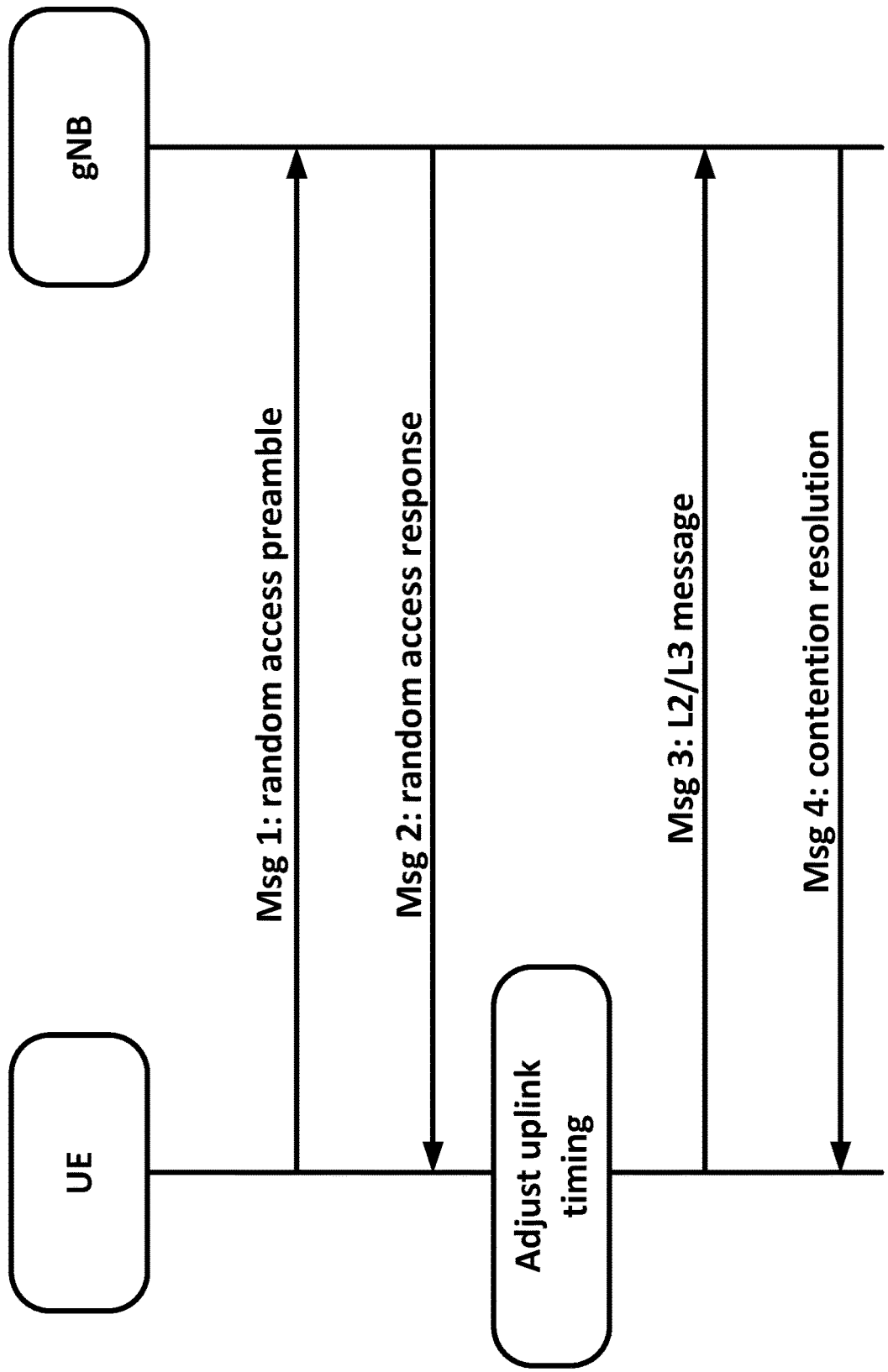
FIG. 1 illustrates a 4-step random access channel (RACH) procedure for initial access.

In NR Rel-15, a 4-step procedure was defined. FIG. 1 illustrates the 4-step random access channel (RACH) procedure for initial access. In the first step, UE transmits physical random access channel (PRACH) in the uplink by randomly selecting one preamble signature, which would allow gNB to estimate the delay between gNB and UE for subsequent UL timing adjustment. Subsequently, in the second step, gNB feedbacks the random access response (RAR) which carries timing advanced (TA) command information and uplink grant for the uplink transmission in the third step. The UE expects to receive the RAR within a time window, of which the start and end are configured by the gNB via system information block (SIB).

As defined in NR Rel-15, number of repetitions is 2 and 4 for PRACH format 1 and 2, respectively, which can help in improving the coverage for long PRACH format. However, for short PRACH format, repetition is not defined. In order to improve the coverage for PRACH, especially short PRACH format, certain mechanisms may need to be defined.

Embodiments herein provide mechanisms for improving coverage for PRACH (e.g., for NR).

In one embodiment, starting position of PRACH occasion and number of PRACH repetitions may be configured by higher layers via minimum system information (MSI), remaining minimum system information (RMSI), other system information (OSI) or dedicated radio resource control (RRC) signalling. Note that the starting position of PRACH occasion may be defined in symbol, slot or frame level.

In another option, PRACH repetition window may be configured by higher layers via MSI, RMSI (SIB1), OSI or RRC signalling. The PRACH repetition window may be aligned with the association period or association pattern period for mapping SSB indexes to PRACH occasions.

Note that PRACH repetition window may be configured as slot or symbol or frame offset and periodicity. For FR2, reference slot offset may be used for PRACH repetition window configuration. Additionally, the number of repetitions for PRACH transmission may be separately configured. In this case, PRACH repetition window, or parameter PrachRepetiotionWindow can be defined as the time interval between first and last repetition for PRACH transmission.

Figure 2:
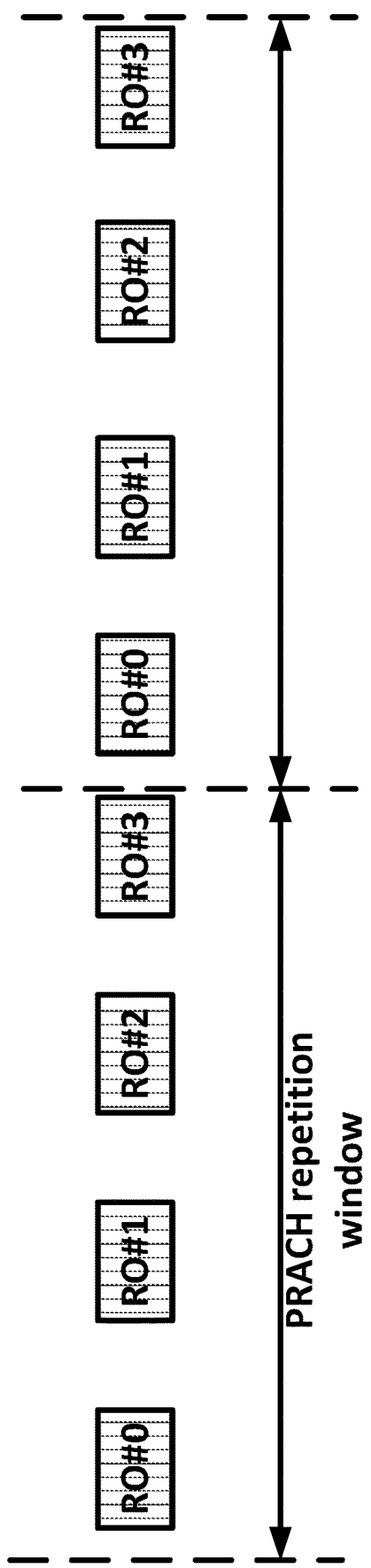
FIG. 2 illustrates one example of physical random access channel (PRACH) repetition window, in accordance with various embodiments.

FIG. 2 illustrates one example of PRACH repetition window. In the example, 4 PRACH occasions (RO) can be configured for PRACH repetition.

In another embodiment, for physical downlink control channel (PDCCH) order PRACH transmission, the number of repetitions for PRACH transmission may be configured by RRC signalling or dynamically indicated in the DCI or a combination thereof.

In accordance with various embodiments, the following text in Section 7.3.1.2.1 in TS38.212 V16.3.0 may be updated as shown in underline.

If the CRC of the DCI format 1_0 is scrambled by C-RNTI and the "Frequency domain resource assignment" field are of all ones, the DCI format 1_0 is for random access procedure initiated by a PDCCH order, with all remaining fields set as follows:

Random Access Preamble index—6 bits according to ra-PreambleIndex in Clause 5.1.2 of [8, TS38.321]

UL/SUL indicator—1 bit. If the value of the "Random Access Preamble index" is not all zeros and if the UE is configured with supplementaryUplink in Serving-CellConfig in the cell, this field indicates which UL carrier in the cell to transmit the PRACH according to Table 7.3.1.1.1-1; otherwise, this field is reserved SS/PBCH index—6 bits. If the value of the "Random Access Preamble index" is not all zeros, this field indicates the SS/PBCH that shall be used to determine the RACH occasion for the PRACH transmission; otherwise, this field is reserved.

PRACH Mask index—4 bits. If the value of the "Random Access Preamble index" is not all zeros, this field indicates the RACH occasion associated with the SS/PBCH indicated by "SS/PBCH index" for the PRACH transmission, according to Clause 5.1.1 of [8, TS38.321]; otherwise, this field is reserved Number of repetitions for PRACH—2 bits Reserved bits—10 bits for operation in a cell with shared spectrum channel access; otherwise 8 bits.

In another embodiment, during the PRACH repetition window, same or different Tx beams may be applied for the transmission of PRACH during repetitions. Further, whether same or different Tx beams can be applied for the transmission of PRACH preamble during repetitions can be configured by higher layers via MSI, RMSI (SIB1), OSI or RRC signalling.

Note that during PRACH repetition, if multiple PRACH occasions with PRACH repetition window associated with same synchronization signal block (SSB) index are multiplexed in a frequency division multiplexing (FDM) manner, UE may only transmit the PRACH preamble in the PRACH occasion (RO) with lowest index or randomly select one RO for transmission of PRACH preamble. Further, UE would continue to transmit the PRACH preamble in the ROs which are multiplexed in a time division multiplexing (TDM) manner with the first RO used for the first PRACH transmission.

In one option, same Tx beam is applied for the transmission of PRACH preamble during repetitions. In this case, UE shall associate a same SSB during repetition. Further, the transmit power or path-loss or reference signal received power is determined in accordance with the selected SSB index associated with the PRACH transmission. In other word, same transmit power is applied for the transmission of PRACH preamble during repetition.

Note that during the repetition, UE may select a same PRACH preamble index during repetition.

Figure 3:
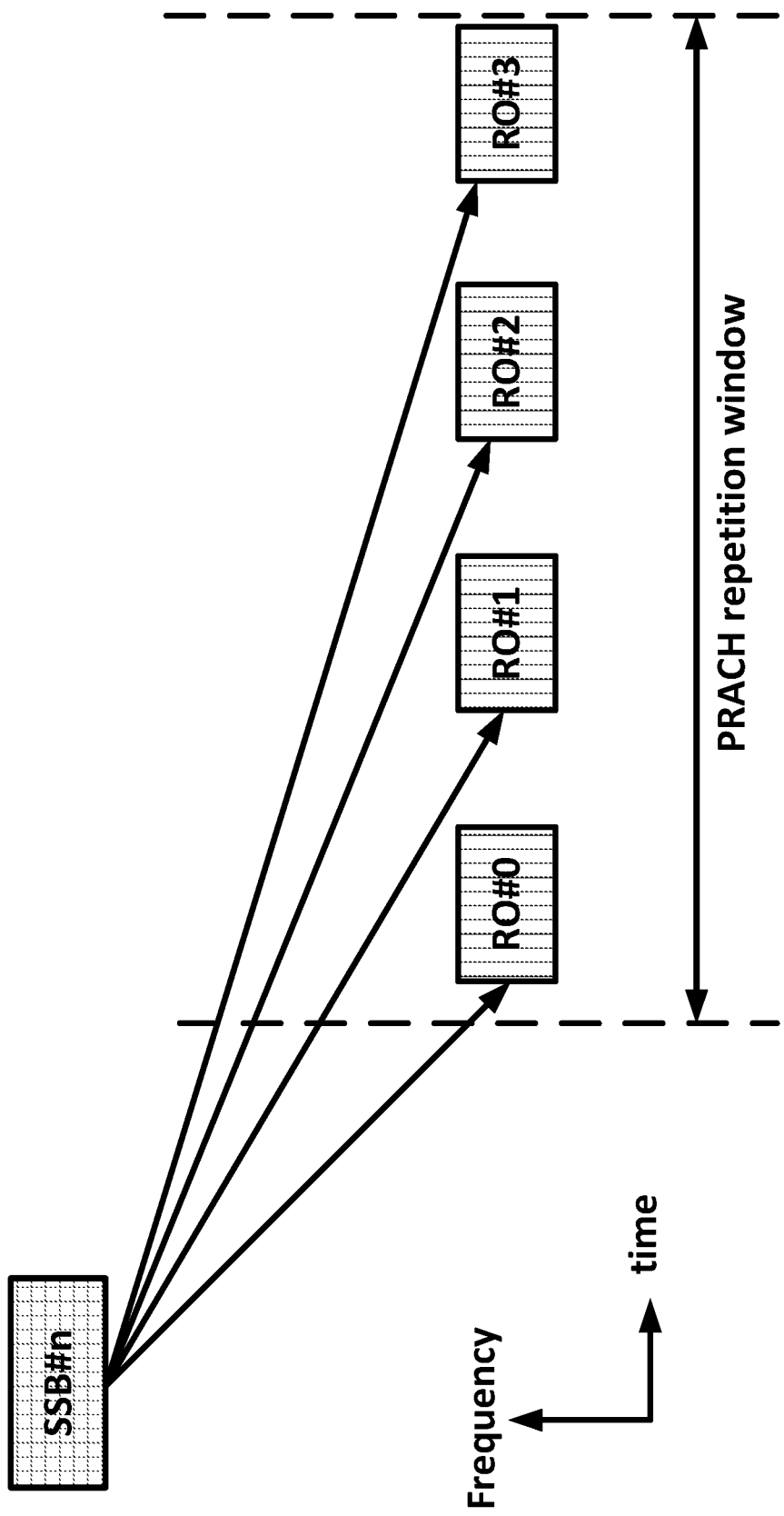
FIG. 3 illustrates one example of applying same synchronization signal block (SSB) association with PRACH occasion (RO) during PRACH repetition, in accordance with various embodiments.

FIG. 3 illustrates one example of applying same SSB association with RO during PRACH repetition. In the example, one SSB index is associated with 4 ROs which are multiplexed in an TDM manner. In this case, UE can apply same Tx beam for the PRACH transmission during repetition.

In another option, different Tx beams can be employed for the transmission of PRACH preamble during repetitions. In this case, different SSB indexes may be associated with different ROs for PRACH transmission. Further, the transmit power or path-loss or reference signal received power is determined in accordance with the selected SSB index associated with different ROs for PRACH repetitions. In other word, different transmit powers may be applied for the transmission of PRACH preamble during repetition.

Note that for this case, UE may randomly select PRACH preamble index during repetition. Alternatively, UE may select the PRACH preamble index which is same in relative to the staring PRACH preamble index associated with different SSB indexes.

Figure 4:
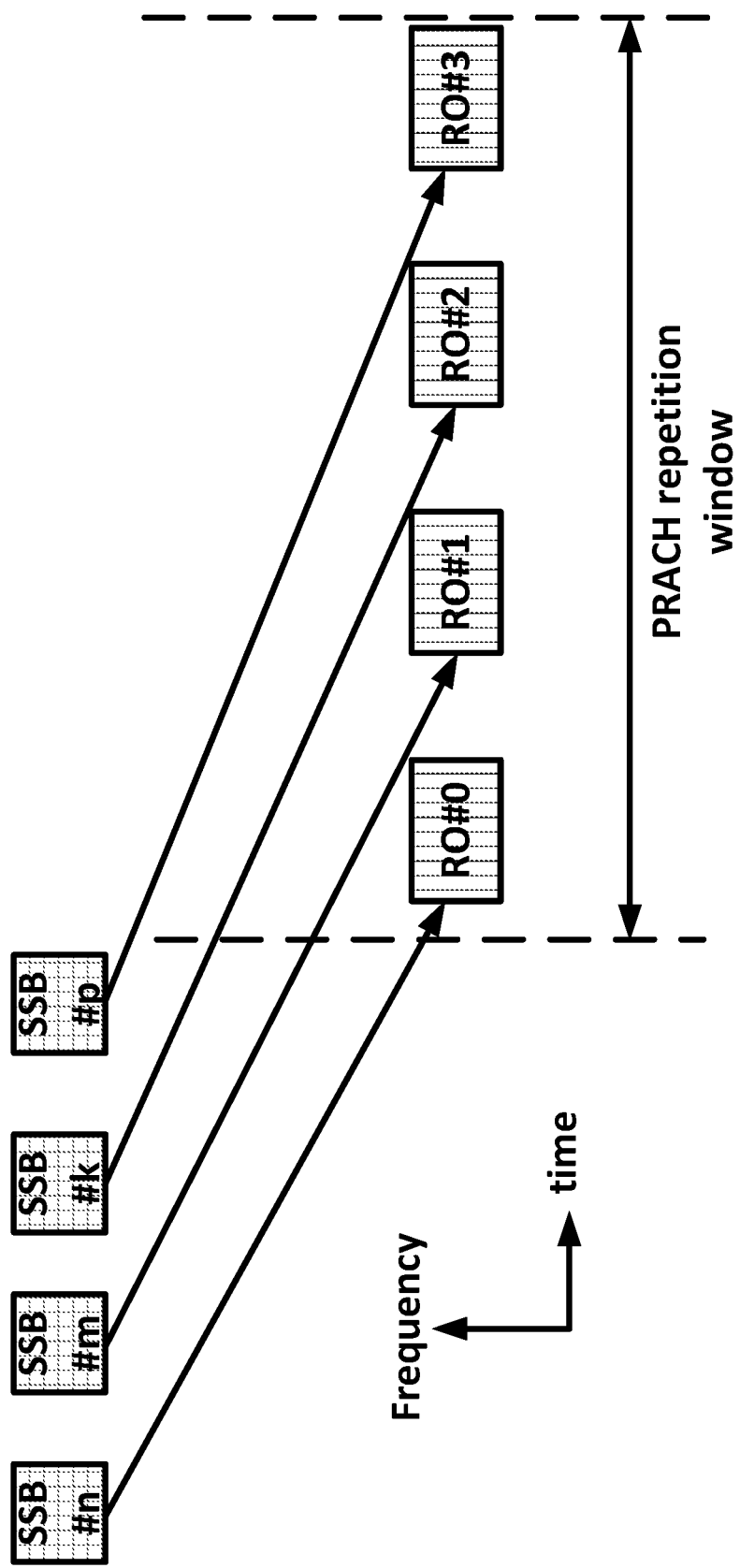
FIG. 4 illustrates one example of applying independent SSB association with RO during PRACH repetition, in accordance with various embodiments.

FIG. 4 illustrates one example of applying independent SSB association with RO during PRACH repetition. In the example, separate SSB indexes are associated with different ROs during PRACH repetition, which indicates that different Tx beams are applied for the PRACH repetition.

In another embodiment, when UE attempts to monitor random access response (RAR) during a RAR window, the window starts at the first symbol of the earliest CORESET the UE is configured to receive PDCCH for Type1-PDCCH common search space (CSS) set, that is at least one symbol, after the last symbol of the PRACH occasion corresponding to the last PRACH transmission.

In accordance with various embodiments, the following text in Section 8.2 in TS38.213 V16.3.0 may be updated as indicated in underline:

In response to a PRACH transmission, a UE attempts to detect a DCI format 1_0 with CRC scrambled by a corresponding RA-RNTI during a window controlled by higher layers [11, TS 38.321]. The window starts at the first symbol of the earliest CORESET the UE is configured to receive PDCCH for Type1-PDCCH CSS set, as defined in Clause 10.1, that is at least one symbol, after the last symbol of the PRACH occasion corresponding to the last PRACH transmission, where the symbol duration corresponds to the SCS for Type1-PDCCH CSS set as defined in Clause 10.1. The length of the window in number of slots, based on the SCS for Type1-PDCCH CSS set, is provided by ra-Response-Window.

In another embodiment, separate PRACH occasions can be configured for PRACH repetition from legacy 4-step and/or 2-step RACH, respectively. In this case, separate parameters for SSB to RO association can be configured for PRACH with repetition. If not configured, the configuration from legacy 4-step RACH and/or 2-step RACH can be reused.

In another embodiment, shared PRACH occasions, but different PRACH preambles may be configured for PRACH repetition from legacy 4-step and/or 2-step RACH, respectively.

For example, 64 preambles may be defined for a PRACH occasion (RO). Further, total number of preambles for contention based random access (CBRA) and contention free random access (CFRA) may be configured by total-NumberOfRA-Preambles, which is further divided into N sets. Each set of PRACH preambles is associated with one synchronization signal block (SSB). Within each set of PRACH preambles associated with same SSB, 4-step CBRA RACH preambles are first mapped, and followed by CBRA 2-step RACH preambles. The remaining preambles may be allocated for CFRA.

When PRACH repetition is configured using 4-step RACH, PRACH preambles for PRACH repetition may be allocated as a part of consecutive preambles for CFRA. In particular, within the set of preambles associated with a same SSB, PRACH preamble for PRACH repetition is allocated after CBRA 2-step RACH.

Figure 5:
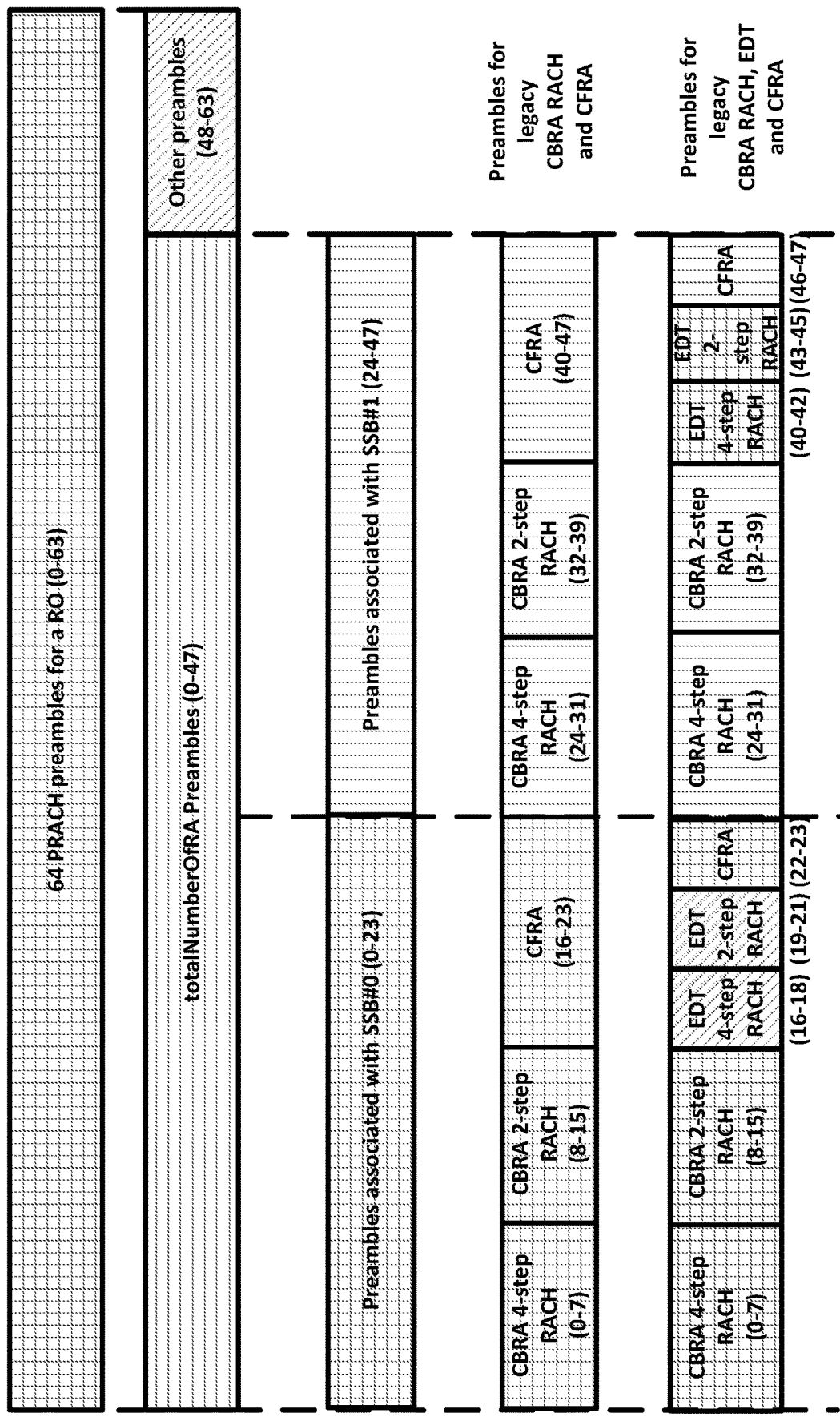
FIG. 5 illustrates one example of PRACH resource partitioning for PRACH repetition and legacy RACH procedure, in accordance with various embodiments.

FIG. 5 illustrates one example of PRACH resource partitioning for PRACH repetition and legacy RACH procedure. In the example, 2 SSBs are associated with one RO. In addition, preambles with index 0-23 are associated with SSB #0 and preambles with index 24-47 are associated with SSB #1. Further, within the preamble associated with a same SSB, PRACH preamble for PRACH repetition is allocated after CBRA 2-step RACH.

In another embodiment, shared PRACH occasions, but different PRACH preambles can be configured for PRACH repetition from legacy 4-step and/or 2-step RACH, respectively. In this option, PRACH repetition for 4-step RACH is allocated within the preambles for legacy CBRA 4-step RACH.

Figure 6:
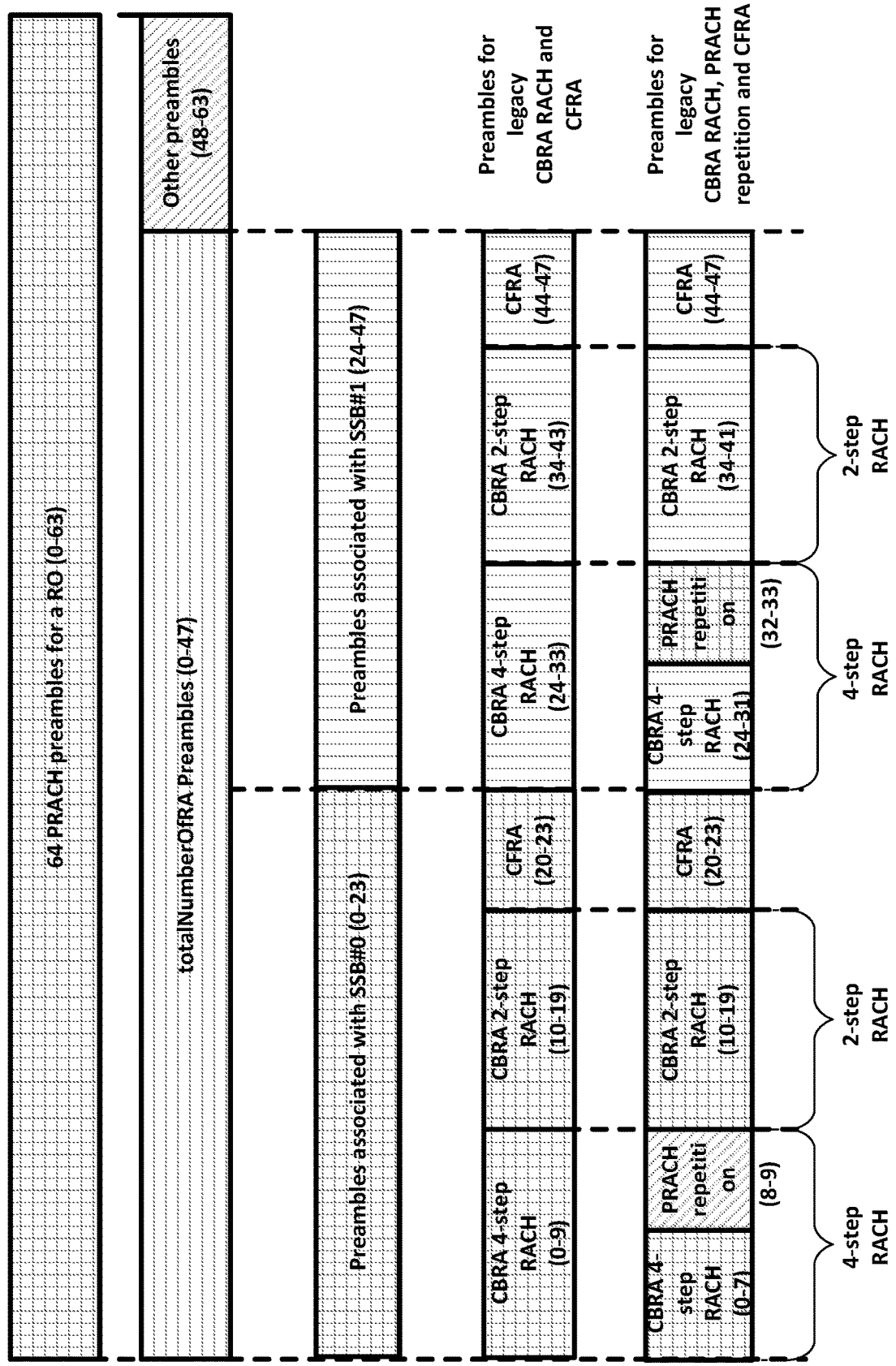
FIG. 6 illustrates one example of PRACH resource partitioning for PRACH repetition and legacy RACH, in accordance with various embodiments.

FIG. 6 illustrates one example of PRACH resource partitioning for PRACH repetition and legacy RACH. In the example, 2 SSBs are associated with one RO. In addition, preambles with index 0-23 are associated with SSB #0 and preambles with index 24-47 are associated with SSB #1 for legacy 4-step RACH and 2-step RACH. Further, within each set of preambles associated with an SSB, preambles for PRACH repetition for 4-step are allocated within preambles for CBRA 4-step RACH.

In another embodiment, when measured Reference Signal Receive Power (RSRP) is less than or equal to a threshold which is configured by higher layers via MSI, RMSI (SIB1), OSI or RRC signalling, UE may employ PRACH repetition during PRACH repetition window. Otherwise, UE may not use PRACH repetition.

Alternatively, when path-loss is greater than or equal to a threshold which is configured by higher layers via MSI, RMSI (SIB1), OSI or RRC signalling, UE may employ PRACH repetition during PRACH repetition window. Otherwise, UE may not use PRACH repetition.

As a further extension, more than one repetition levels may be configured, which corresponds to different threshold, which can be configured by higher layers via MSI, RMSI (SIB1), OSI or RRC signaling.

In another embodiment of the disclosure, PRACH repetition may also apply for contention free random access (CFRA) procedure. In this case, dedicated PRACH preamble for PRACH repetition, and PRACH repetition window (which may include starting position and number of repetitions or duration of PRACH repetitions) may be configured by dedicated RRC signalling.

Repetition of CSI Report on PUSCH for Coverage Enhancement

For NR, dynamic grant and configured grant based physical uplink shared channel (PUSCH) transmission are supported. For dynamic grant PUSCH transmission, PUSCH is scheduled by DCI format 0_0, 0_1 or 0_2. Further, two types of configured grant PUSCH transmission are specified. In particular, for Type 1 configured grant PUSCH transmission, UL data transmission is only based on radio resource control (RRC) (re)configuration without any layer 1 (L1) signaling. In particular, semi-static resource may be configured for one UE, which includes time and frequency resource, modulation and coding scheme, reference signal, etc. For Type 2 configured grant PUSCH transmission, UL data transmission is based on both RRC configuration and L1 signaling to activate/deactivate UL data transmission.

Note that uplink control information (UCI) can be carried by physical uplink control channel (PUCCH) or PUSCH. In particular, UCI may include scheduling request (SR), hybrid automatic repeat request-acknowledgement (HARQ-ACK) feedback, channel state information (CSI) report, e.g., channel quality indicator (CQI), pre-coding matrix indicator (PMI), CSI resource indicator (CRI) and rank indicator (RI) and/or beam related information (e.g., L1-RSRP (layer 1-reference signal received power)).

In NR, if PUSCH slot aggregation is enabled, aperiodic CSI (A-CSI) is multiplexed only in the PUSCH in the first slot. Further, A-CSI report triggered by DCI on PUSCH repetition Type B without UL-SCH is carried on the first nominal repetition with the other nominal repetitions discarded, In addition, CSI report triggered by DCI on PUSCH repetition Type B with UL-SCH is carried on the first actual repetition.

Similarly, PUSCH scheduled by DCI scrambled by SP-CSI-RNTI doesn't support repetition. In other words, semi-persistent CSI (SP-CSI) is not repeated on PUSCH. In addition, SP-CSI cannot be multiplexed with uplink data.

Figure 7:
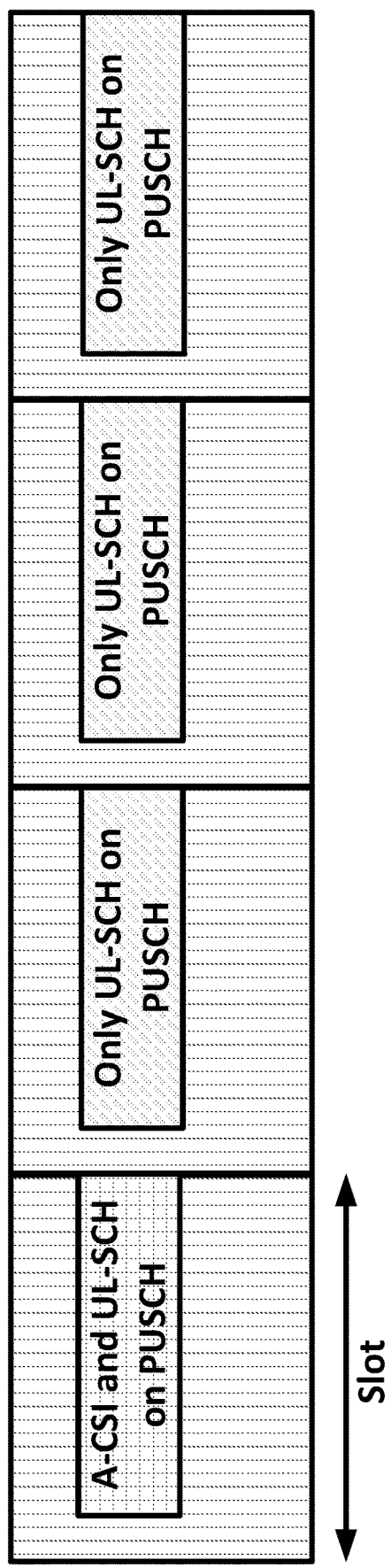
FIG. 7 illustrates one example of aperiodic channel state information (A-CSI) on physical uplink shared channel (PUSCH) with repetition.

FIG. 7 illustrates one example of A-CSI on PUSCH with repetition. In FIG. 1, A-CSI is only multiplexed with UL-SCH on the first PUSCH repetition. Note that although PUSCH repetition type A is shown in FIG. 1, the same mechanism is applied for PUSCH repetition type B.

The following text in Section 6.1.2.1 in TS38.214 V16.3.0 describes the CSI report on PUSCH repetition type B:

For PUSCH repetition Type B, when a UE receives a DCI that schedules aperiodic CSI report(s) or activates semi-persistent CSI report(s) on PUSCH with no transport block by a CSI request field on a DCI, the number of nominal repetitions is always assumed to be 1, regardless of the value of numberofrepetitions. When the UE is scheduled to transmit a PUSCH repetition Type B with no transport block and with aperiodic or semi-persistent CSI report(s) by a CSI request field on a DCI, the first nominal repetition is expected to be the same as the first actual repetition. For PUSCH repetition Type B carrying semi-persistent CSI report(s) without a corresponding PDCCH after being activated on PUSCH by a CSI request field on a DCI, if the first nominal repetition is not the same as the first actual repetition, the first nominal repetition is omitted; otherwise, the first nominal repetition is omitted according to the conditions in Clause 11.1 of [6, TS38.213].

For PUSCH repetition Type B, when a UE is scheduled to transmit a transport block and aperiodic CSI report(s) on PUSCH by a CSI request field on a DCI, the CSI report(s) is multiplexed only on the first actual repetition. The UE does not expect that the first actual repetition has a single symbol duration.

As mentioned above, given that CSI repetition on PUSCH is not supported, this may result in certain coverage issue for CSI report including A-CSI and SP-CSI. Given that CSI carries critical information for proper scheduling of downlink transmission, this unreliable CSI report may affect performance for physical downlink shared channel (PDSCH) and physical downlink control channel (PDCCH). In this regard, it is desirable to enable repetition for CSI report when multiplexed on PUSCH so as to improve the coverage. In this case, certain mechanisms may need to be considered to support repetition of CSI report on PUSCH.

Accordingly, various embodiments herein provide techniques for repetition of CSI report on PUSCH for coverage enhancement.

In one embodiment, whether repetition of CSI report on PUSCH is enabled can be configured by higher layers via minimum system information (MR), remaining minimum system information (RMSI), other system information (OSI) or dedicated radio resource control (RRC) signalling. It may be configured per DCI format for triggering the A-CSI or as part of configuration for SP-CSI reporting on PUSCH.

For example, when repetition of CSI report on PUSCH is enabled, UE shall repeat the A-CSI or SP-CSI report on PUSCH.

In another embodiment, number of repetitions for CSI report on PUSCH may be separately configured or indicated from the number of repetitions for PUSCH. If not configured, the number of repetitions for CSI report on PUSCH can use the one which is configured or indicated for the PUSCH transmission.

In one option, for PUSCH repetition type A, number of repetitions for CSI report on PUSCH can be separately configured from pusch-AggregationFactor or separately indicated from numberofrepetitions as part of PUSCH time domain resource assignment (TDRA) indication by DCI formats 0_1 or 0_2. If not configured or indicated separately, it can reuse pusch-AggregationFactor or as indicated via numberofrepetitions as part of TDRA indication by DCI formats 0_1 or 0_2. Further, the number of repetitions may be configured as part of CSI-ReportConfig configuration. In another variant, the number of repetitions for PUSCH carrying A-CSI may be provided to the UE as scaling factor to the number of repetitions indicated for the PUSCH via pusch-AggregationFactor or via numberofrepetitions as part of TDRA indication.

In another option, for PUSCH repetition type B, number of repetitions for CSI report on PUSCH can be separately indicated from numberofrepetitions as part of TDRA indication by DCI formats 0_1 or 0_2. If not configured, it can reuse numberofrepetitions. Further, the number of repetitions may be configured as part of CSI-ReportConfig configuration. In another variant, the number of repetitions for PUSCH carrying A-CSI may be provided to the UE as scaling factor to the number of repetitions indicated for the PUSCH via pusch-AggregationFactor or via numberofrepetitions as part of TDRA indication.

Note that when A-CSI is multiplexed on PUSCH with transport block, the number of repetitions of A-CSI may follow the number of repetitions for PUSCH. Alternatively, the numbers of repetitions for A-CSI on PUSCH may follow the value that may be provided separately from pusch-AggregationFactor or numberofrepetitions as described above, irrespective of whether the A-CSI is multiplexed with UL-SCH in a PUSCH or is transmitted in the PUSCH without any UL-SCH.

When repetition factor for A-CSI is provided separately from PUSCH repetition factor, a UE may not be expected to be indicated with the repetition factor for A-CSI on PUSCH denoted by N and with a repetition factor for PUSCH denoted by M so that N is greater than M, when UL-SCH indicator in DCI format 0_1 or 0_2 is enabled.

In one embodiment, the number of repetitions for SP-CSI on PUSCH is provided as part of higher layer configuration for CSI-ReportConfig, including indication of Type A or B repetitions for each of the semi-persistent PUSCH occasions. In another example of the embodiment, the number of repetitions for SP-CSI on PUSCH may be provided to the UE via a combination of higher layers signaling (e.g., as part of CSI-ReportConfig) as well as the indication in the DCI format used to activate the SP-CSI report transmissions. In yet another example of the embodiment, the number of repetitions for SP-CSI on PUSCH may be provided to the UE via the TDRA field, through the numberofrepetitions component, in the DCI format used to activate the SP-CSI report transmissions.

Further, in an example, when provided with SP-CSI on PUSCH configuration using repetitions, each PUSCH is repeated either following Type A or Type B PUSCH repetitions (as indicated or specified), and the UE does not expect the periodicity of the PUSCH occasions (corresponding to first of a number of repetitions for each PUSCH) to be shorter than the duration corresponding to the configured or indicated number of repetitions for each PUSCH.

In another embodiment, the number of repetitions for A-CSI or SP-CSI multiplexed on PUSCH can be configured by a bitmap indicated by higher layers signaling. The size of a bitmap corresponds to the number of repetitions for PUSCH, and the bit value indicates which PUSCH repetitions include the A-CSI or SP-CSI transmission.

In another embodiment, for PUSCH repetition type A, A-CSI or SP-CSI can be carried in each PUSCH repetition.

In one option, when A-CSI or SP-CSI is multiplexed on PUSCH with no transport block, the number of repetitions of CSI report on PUSCH may follow the number of repetitions which is configured for CSI report on PUSCH. Alternatively, it may follow the number of repetitions which is configured for PUSCH transmission.

In another option, when A-CSI is multiplexed on PUSCH with transport block, the number of repetitions for A-CSI on PUSCH follows the number of repetitions for PUSCH.

Figure 8:
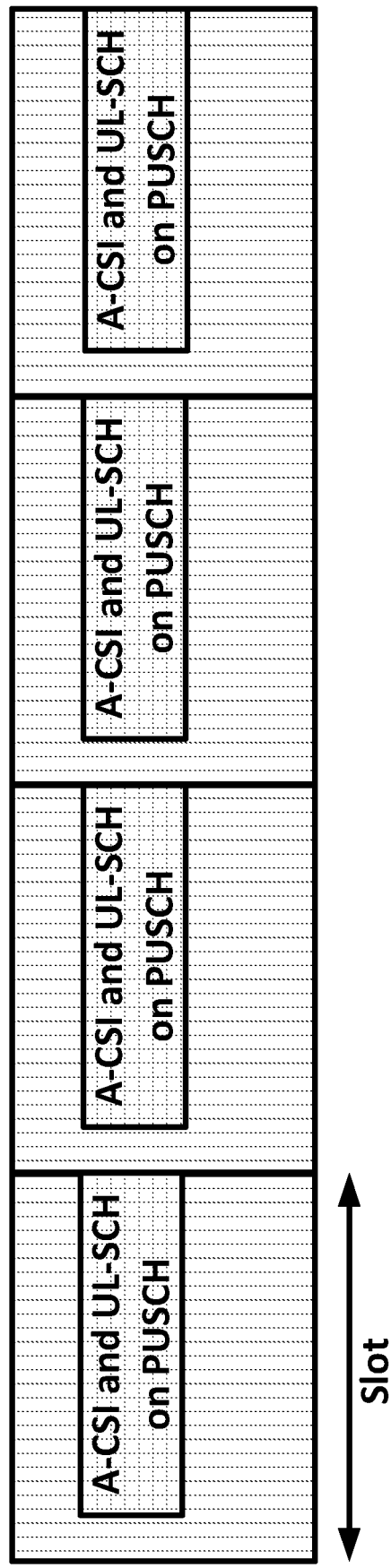
FIG. 8 illustrates one example of repeated A-CSI on PUSCH repetition type A, in accordance with various embodiments.

FIG. 8 illustrates one example of repeated A-CSI on PUSCH repetition type A. In the example, A-CSI is multiplexed on PUSCH with transport block or UL-SCH in each slot. In addition, 4 repetitions are applied for A-CSI on PUSCH repetition type A.

In another embodiment, for PUSCH repetition type B, A-CSI or SP-CSI report may be carried on each nominal repetition.

In one option, for PUSCH repetition Type B, when a UE receives a DCI that schedules aperiodic CSI report(s) or activates semi-persistent CSI report(s) on PUSCH with no transport block by a CSI request field on a DCI, UE shall transmit A-CSI or SP-CSI reports on each actual repetition that is same as the indicated nominal repetition. When one nominal repetition is segmented into more than one actual repetition due to crossing slot boundary, conflict with invalid symbols or semi-static DL symbols, actual repetitions are not utilized for A-CSI or SP-CSI mapping.

Figure 9:
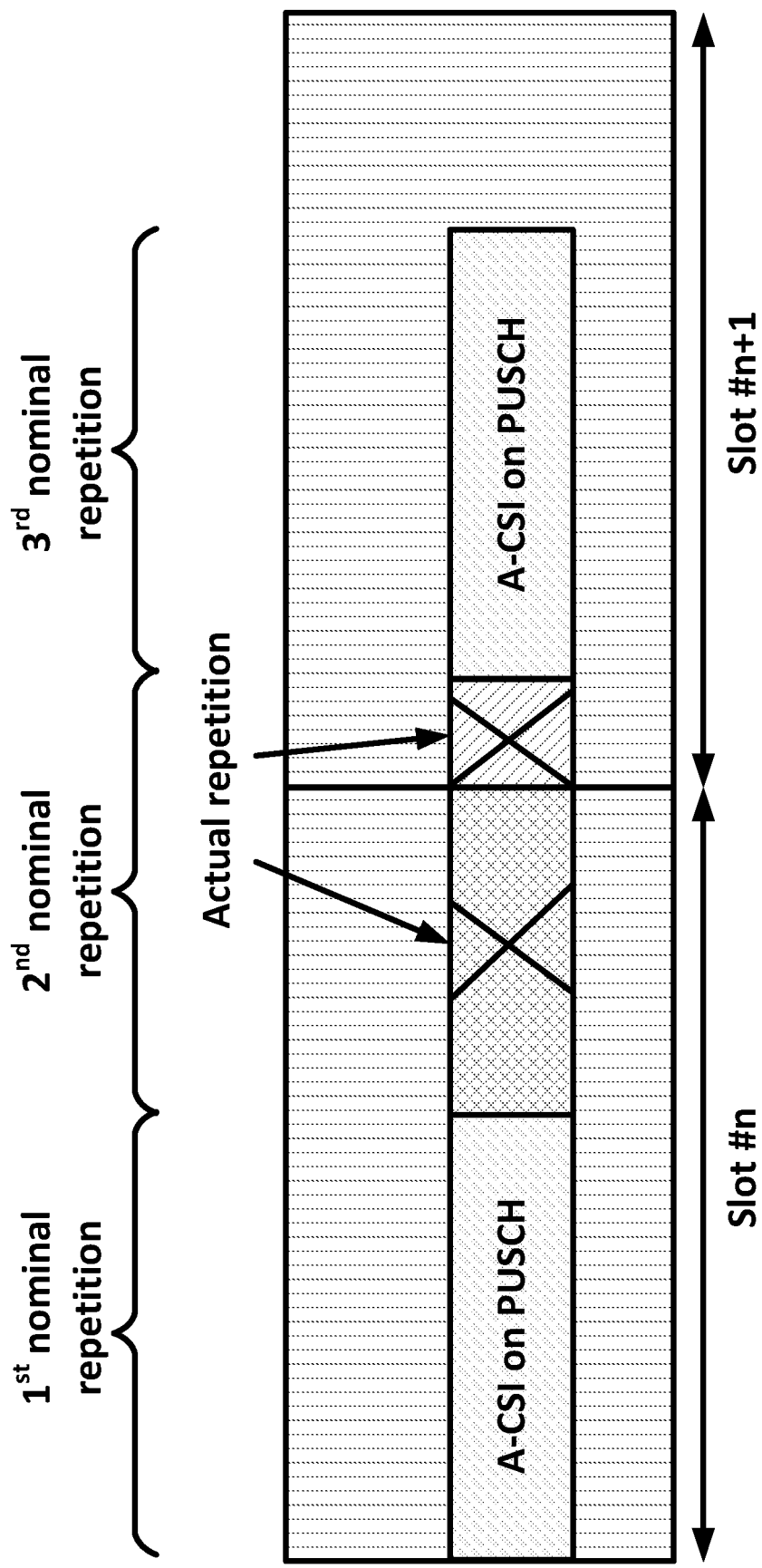
FIG. 9 illustrates one example of carrying A-CSI report on each nominal repetition when A-CSI report is transmitted on PUSCH with no transport block, in accordance with various embodiments.

FIG. 9 illustrates one example of carrying A-CSI report on each nominal repetition when A-CSI report is transmitted on PUSCH with no transport block. In the example, $2^{nd}$ nominal repetition crosses slot boundary and is segmented into two actual repetitions. In this case, A-CSI report is only transmitted on $1^{st}$ and $3^{rd}$ nominal repetition. The actual repetitions in $2^{nd}$ nominal repetition are dropped.

In another option, for PUSCH repetition Type B, when a UE receives a DCI that schedules aperiodic CSI report(s) or activates semi-persistent CSI report(s) on PUSCH with transport block by a CSI request field on a DCI, UE shall transmit A-CSI or SP-CSI reports with transport block on each actual repetition that is same as the indicated nominal repetition. In addition, UE shall transmit only transport block without A-CSI or SP-CSI report on actual repetition when actual repetition is not same as nominal repetition.

Alternatively, regardless of whether transport block is present on PUSCH, when duration of actual repetition is less than that for indicated nominal repetition, the actual repetition is dropped.

Figure 10:
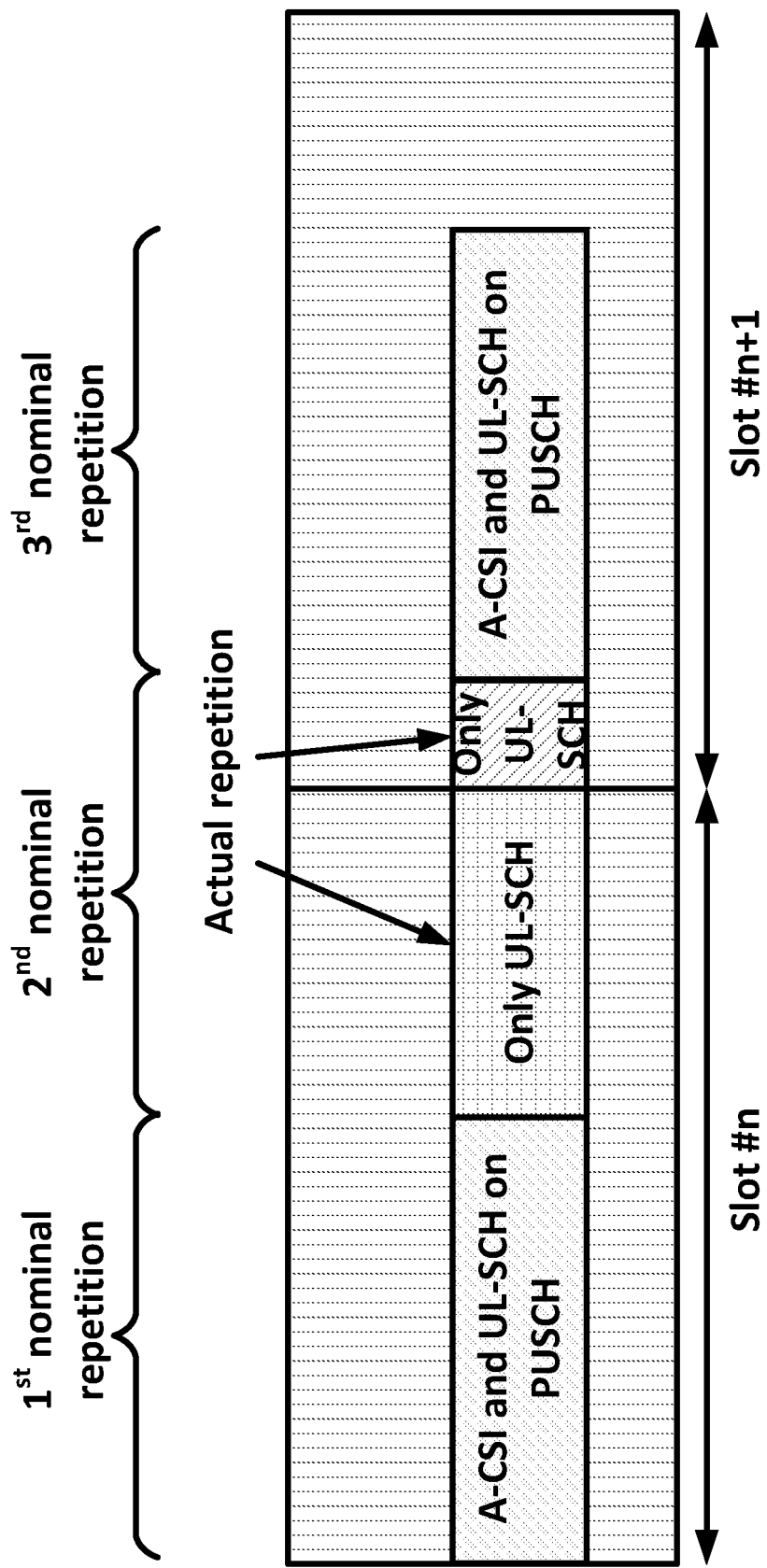
FIG. 10 illustrates one example of carrying A-CSI report on each nominal repetition when A-CSI report is transmitted on PUSCH with transport block, in accordance with various embodiments.

FIG. 10 illustrates one example of carrying A-CSI report on each nominal repetition when A-CSI report is transmitted on PUSCH with transport block. In the example, 2nd nominal repetition crosses slot boundary and is segmented into two actual repetitions. In this case, A-CSI report is only transmitted on $1^{st}$ and $3^{rd}$ nominal repetition. Further, only transport block or UL-SCH is transmitted in actual PUSCH repetitions in $2^{nd}$ nominal repetition.

In another embodiment, for PUSCH repetition type B, when the number of bits for CSI report is less than or equal to 11 bits, CSI report is carried in each actual repetition regardless of whether transport block is present on PUSCH.

Figure 11:
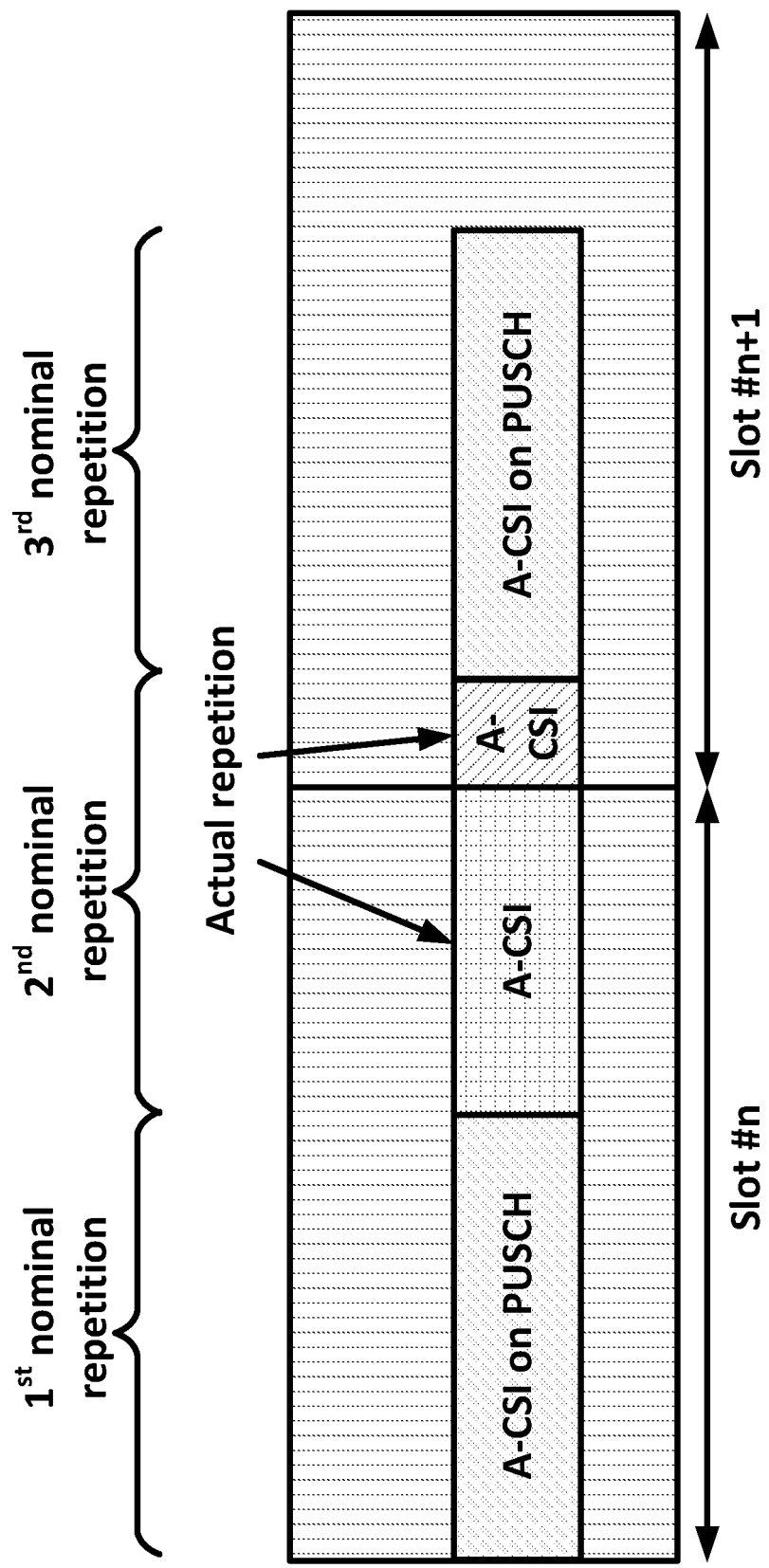
FIG. 11 illustrates one example of carrying A-CSI report on each actual repetition when A-CSI report is transmitted on PUSCH with no transport block, in accordance with various embodiments.

FIG. 11 illustrates one example of carrying A-CSI report on each actual repetition when A-CSI report is transmitted on PUSCH with no transport block. The number of bits for A-CSI report is less than or equal to 11. In the example, $2^{nd}$ nominal repetition crosses slot boundary and is segmented into two actual repetitions. In this case, A-CSI report is transmitted on $1^{st}$ and $3^{rd}$ nominal repetition and using the two actual repetitions in $2^{nd}$ nominal repetition.

In another embodiment, for PUSCH repetition type B, part of symbols from nominal repetition may be repeated and transmitted in actual repetition. This may be applied for the cases when transport block is present on PUSCH or when transport block is not present on PUSCH.

As a further extension, a threshold may be defined for the ratio between the length of actual repetition and nominal repetition. Further, the threshold may be configured by higher layers via MSI, RMSI (SIB1), OSI or RRC signalling. When the ratio between the length of actual repetition and nominal repetition is less than the threshold, and when CSI report is multiplexed on PUSCH without transport block, CSI report is dropped. When CSI report is multiplexed on PUSCH with transport block, only transport block is transmitted on PUSCH.

When the ratio between the length of actual repetition and nominal repetition is greater than or equal to the threshold, part of symbols from nominal repetition may be repeated and transmitted in actual repetition.

Figure 12:
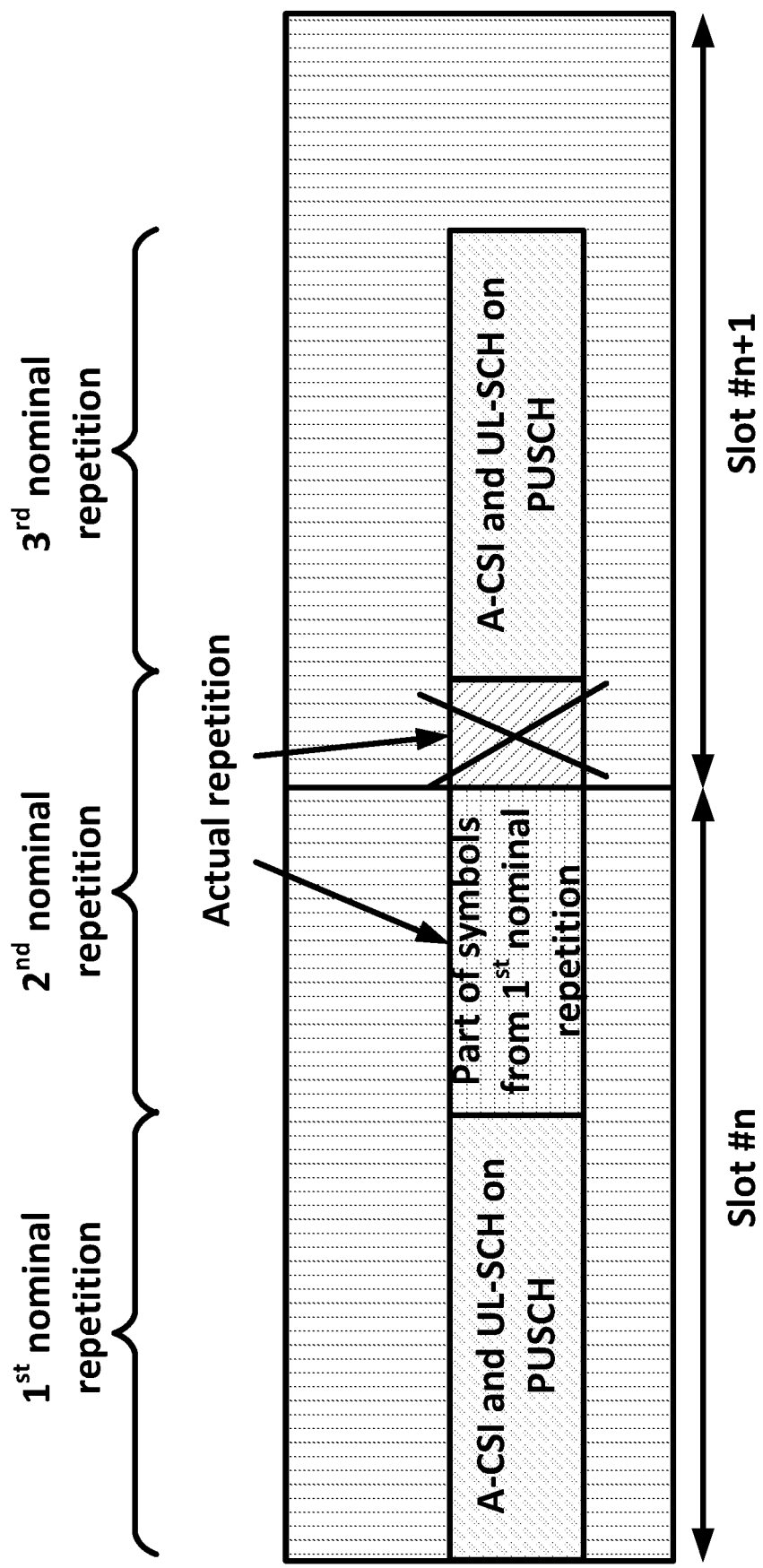
FIG. 12 illustrates one example of repeating part of symbols from nominal repetition from the first actual PUCCH repetition, in accordance with various embodiments.

FIG. 12 illustrates one example of repeating part of symbols from nominal repetition from the first actual PUCCH repetition. In the example, $2^{nd}$ nominal repetition crosses slot boundary and is segmented into two actual repetitions. In this case, A-CSI report is transmitted on $1^{st}$ and $3^{rd}$ nominal repetition. Further, based on the threshold, part of symbols from $1^{st}$ nominal repetition are repeated and transmitted in the $1^{st}$ actual repetition of the 2nd nominal repetition and $2^{nd}$ actual repetition of the 2nd nominal repetition is cancelled.

Additionally, the procedure for selection of different nominal symbols for $1^{st}$ and $2^{nd}$ actual repetitions of the nominal repetition divided by slot boundary can be used. For example, symbols from nominal repetition are repeated in $1^{st}$ and $2^{nd}$ actual repetition based on the segmentation, respectively.

In another embodiment, for PUSCH repetition type B, CSI report is carried in each actual repetition regardless of whether transport block is present on PUSCH.

In one embodiment, when repetition of A-CSI/SP-CSI on PUSCH is enabled, number of resource elements for A-CSI or SP-CSI on PUSCH may be determined in accordance with one of the following options:

The total number of REs for PUSCH for determination of the REs for A-CSI/SP-CSI part 1 and part 2 may be calculated from the nominal repetition length The total number of REs for PUSCH for determination of the REs for A-CSI/SP-CSI part 1 and part 2 may be calculated from an actual repetition length In one option, the first actual repetition length may be used.

In another option, the minimum length among all scheduled actual repetitions may be used.

In yet another option, the maximum length among all scheduled actual repetitions may be used.

Systems and Implementations

Figure 13:
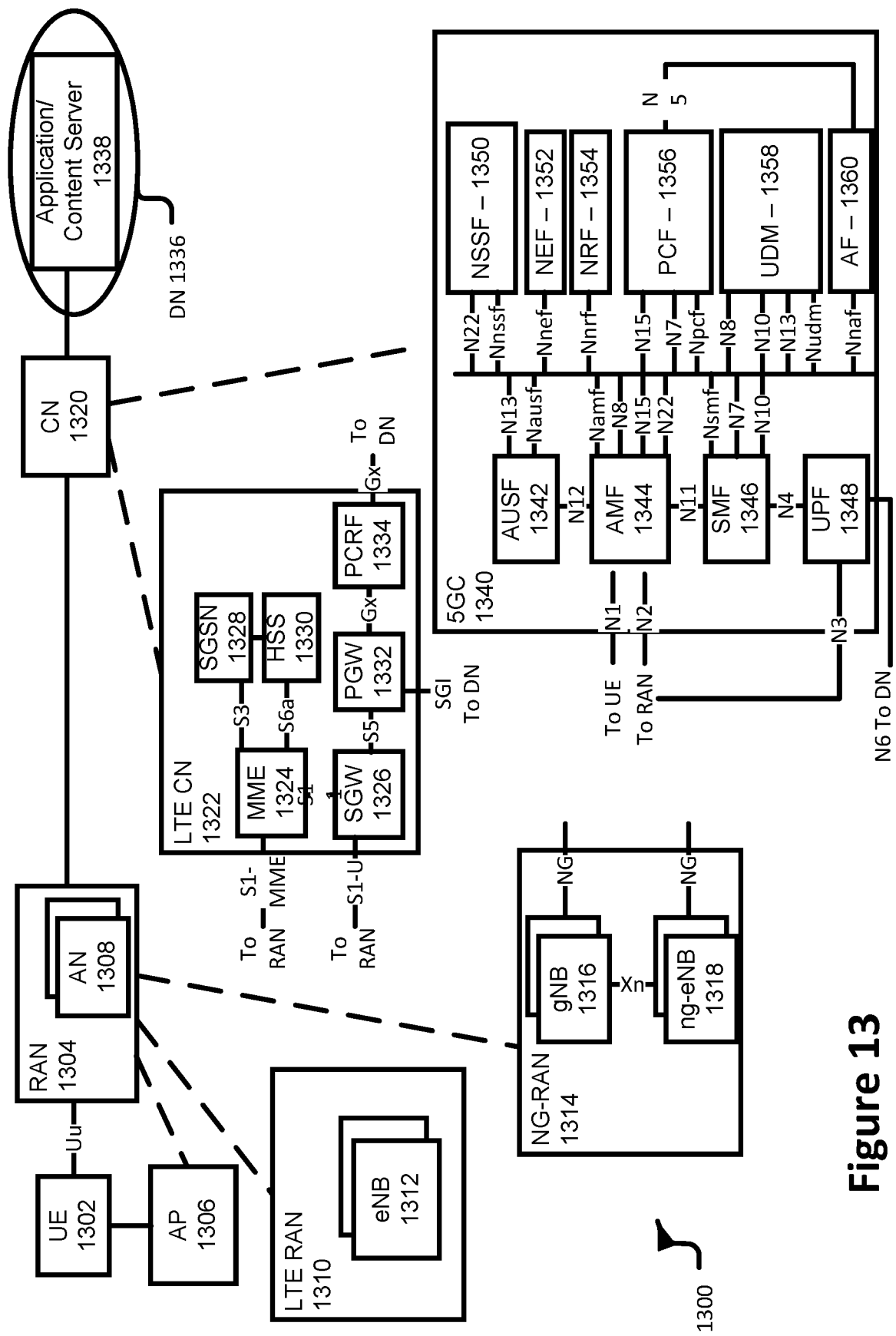
FIG. 13 schematically illustrates a wireless network in accordance with various embodiments.
Figure 14:
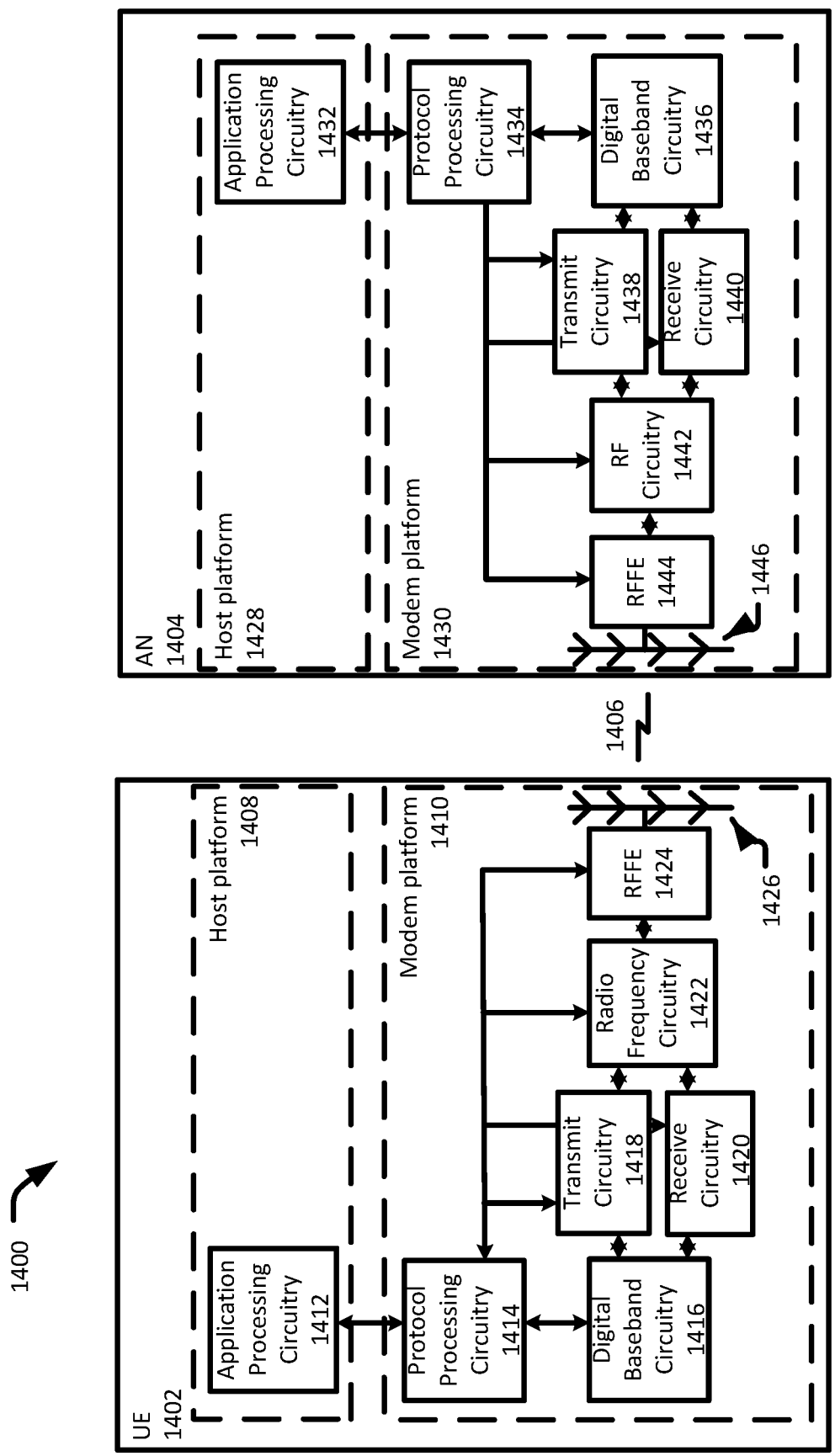
FIG. 14 schematically illustrates components of a wireless network in accordance with various embodiments.
Figure 15:
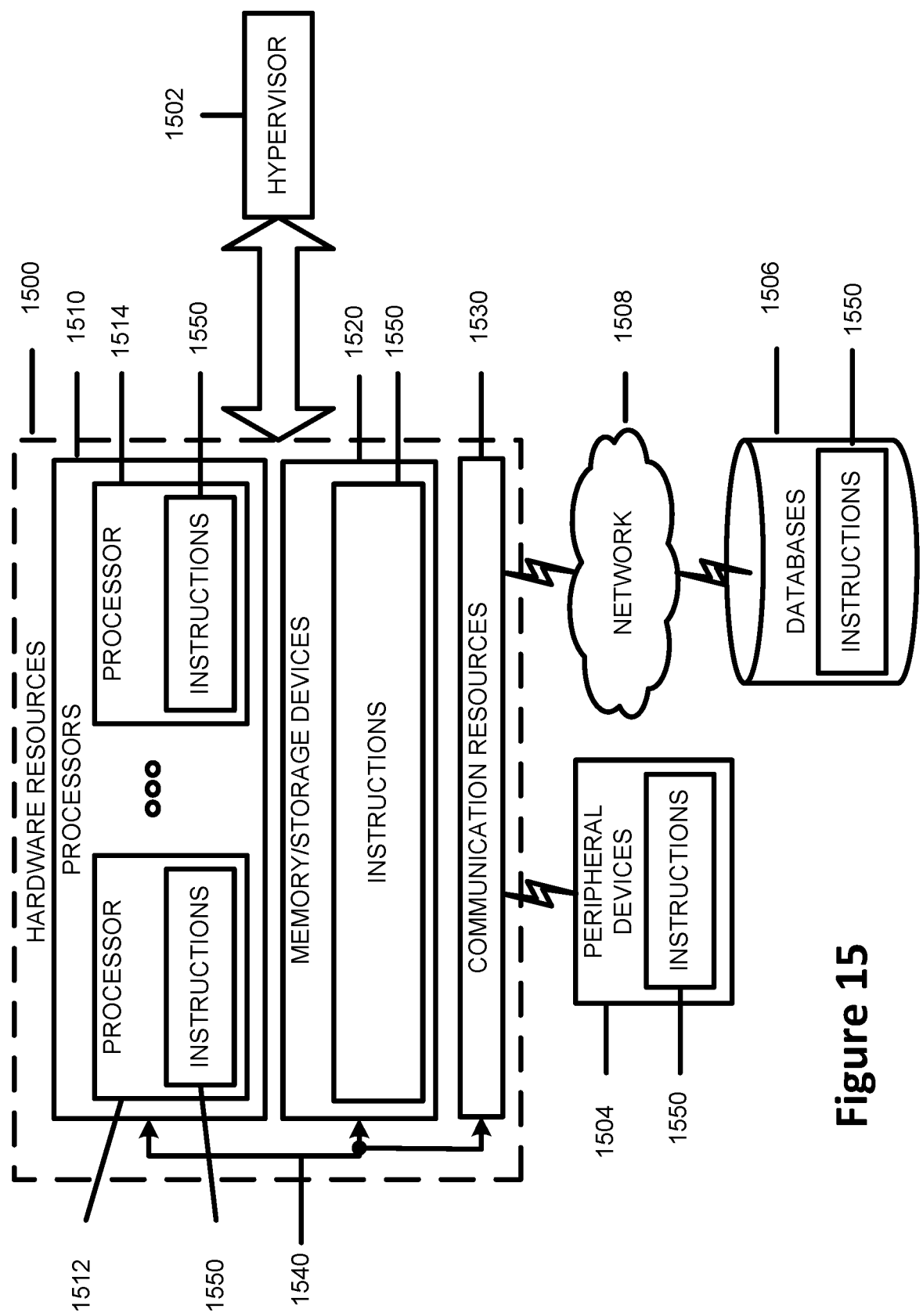
FIG. 15 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 13-15 illustrate various systems, devices, and components that may implement aspects of disclosed embodiments.

FIG. 13 illustrates a network 1300 in accordance with various embodiments. The network 1300 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 1300 may include a UE 1302, which may include any mobile or non-mobile computing device designed to communicate with a RAN 1304 via an over-the-air connection. The UE 1302 may be communicatively coupled with the RAN 1304 by a Uu interface. The UE 1302 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 1300 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 1302 may additionally communicate with an AP 1306 via an over-the-air connection. The AP 1306 may manage a WLAN connection, which may serve to offload some/all network traffic from the RAN 1304. The connection between the UE 1302 and the AP 1306 may be consistent with any IEEE 802.11 protocol, wherein the AP 1306 could be a wireless fidelity (Wi-Fi®) router. In some embodiments, the UE 1302, RAN 1304, and AP 1306 may utilize cellular-WLAN aggregation (for example, LWA/LWIP). Cellular-WLAN aggregation may involve the UE 1302 being configured by the RAN 1304 to utilize both cellular radio resources and WLAN resources.

The RAN 1304 may include one or more access nodes, for example, AN 1308. AN 1308 may terminate air-interface protocols for the UE 1302 by providing access stratum protocols including RRC, PDCP, RLC, MAC, and L1 protocols. In this manner, the AN 1308 may enable data/voice connectivity between CN 1320 and the UE 1302. In some embodiments, the AN 1308 may be implemented in a discrete device or as one or more software entities running on server computers as part of, for example, a virtual network, which may be referred to as a CRAN or virtual baseband unit pool. The AN 1308 be referred to as a BS, gNB, RAN node, eNB, ng-eNB, NodeB, RSU, TRxP, TRP, etc. The AN 1308 may be a macrocell base station or a low power base station for providing femtocells, picocells or other like cells having smaller coverage areas, smaller user capacity, or higher bandwidth compared to macrocells.

In embodiments in which the RAN 1304 includes a plurality of ANs, they may be coupled with one another via an X2 interface (if the RAN 1304 is an LTE RAN) or an Xn interface (if the RAN 1304 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 1304 may each manage one or more cells, cell groups, component carriers, etc. to provide the UE 1302 with an air interface for network access. The UE 1302 may be simultaneously connected with a plurality of cells provided by the same or different ANs of the RAN 1304. For example, the UE 1302 and RAN 1304 may use carrier aggregation to allow the UE 1302 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 1304 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 1302 or AN 1308 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 1304 may be an LTE RAN 1310 with eNBs, for example, eNB 1312. The LTE RAN 1310 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 1304 may be an NG-RAN 1314 with gNBs, for example, gNB 1316, or ng-eNBs, for example, ng-eNB 1318. The gNB 1316 may connect with 5G-enabled UEs using a 5G NR interface. The gNB 1316 may connect with a 5G core through an NG interface, which may include an N2 interface or an N3 interface. The ng-eNB 1318 may also connect with the 5G core through an NG interface, but may connect with a UE via an LTE air interface. The gNB 1316 and the ng-eNB 1318 may connect with each other over an Xn interface.

In some embodiments, the NG interface may be split into two parts, an NG user plane (NG-U) interface, which carries traffic data between the nodes of the NG-RAN 1314 and a UPF 1348 (e.g., N3 interface), and an NG control plane (NG-C) interface, which is a signaling interface between the nodes of the NG-RAN 1314 and an AMF 1344 (e.g., N2 interface).

The NG-RAN 1314 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 1302 can be configured with multiple BWPs where each BWP configuration has a different SCS. When a BWP change is indicated to the UE 1302, the SCS of the transmission is changed as well. Another use case example of BWP is related to power saving. In particular, multiple BWPs can be configured for the UE 1302 with different amount of frequency resources (for example, PRBs) to support data transmission under different traffic loading scenarios. A BWP containing a smaller number of PRBs can be used for data transmission with small traffic load while allowing power saving at the UE 1302 and in some cases at the gNB 1316. A BWP containing a larger number of PRBs can be used for scenarios with higher traffic load.

The RAN 1304 is communicatively coupled to CN 1320 that includes network elements to provide various functions to support data and telecommunications services to customers/subscribers (for example, users of UE 1302). The components of the CN 1320 may be implemented in one physical node or separate physical nodes. In some embodiments, NFV may be utilized to virtualize any or all of the functions provided by the network elements of the CN 1320 onto physical compute/storage resources in servers, switches, etc. A logical instantiation of the CN 1320 may be referred to as a network slice, and a logical instantiation of a portion of the CN 1320 may be referred to as a network sub-slice.

In some embodiments, the CN 1320 may be an LTE CN 1322, which may also be referred to as an EPC. The LTE CN 1322 may include MME 1324, SGW 1326, SGSN 1328, HSS 1330, PGW 1332, and PCRF 1334 coupled with one another over interfaces (or "reference points") as shown. Functions of the elements of the LTE CN 1322 may be briefly introduced as follows.

The MME 1324 may implement mobility management functions to track a current location of the UE 1302 to facilitate paging, bearer activation/deactivation, handovers, gateway selection, authentication, etc.

The SGW 1326 may terminate an S1 interface toward the RAN and route data packets between the RAN and the LTE CN 1322. The SGW 1326 may be a local mobility anchor point for inter-RAN node handovers and also may provide an anchor for inter-3GPP mobility. Other responsibilities may include lawful intercept, charging, and some policy enforcement.

The SGSN 1328 may track a location of the UE 1302 and perform security functions and access control. In addition, the SGSN 1328 may perform inter-EPC node signaling for mobility between different RAT networks; PDN and S-GW selection as specified by MME 1324; MME selection for handovers; etc. The S3 reference point between the MME 1324 and the SGSN 1328 may enable user and bearer information exchange for inter-3GPP access network mobility in idle/active states.

The HSS 1330 may include a database for network users, including subscription-related information to support the network entities' handling of communication sessions. The HSS 1330 can provide support for routing/roaming, authentication, authorization, naming/addressing resolution, location dependencies, etc. An S6a reference point between the HSS 1330 and the MME 1324 may enable transfer of subscription and authentication data for authenticating/authorizing user access to the LTE CN 1320.

The PGW 1332 may terminate an SGi interface toward a data network (DN) 1336 that may include an application/content server 1338. The PGW 1332 may route data packets between the LTE CN 1322 and the data network 1336. The PGW 1332 may be coupled with the SGW 1326 by an S5 reference point to facilitate user plane tunneling and tunnel management. The PGW 1332 may further include a node for policy enforcement and charging data collection (for example, PCEF). Additionally, the SGi reference point between the PGW 1332 and the data network 1336 may be an operator external public, a private PDN, or an intra-operator packet data network, for example, for provision of IMS services. The PGW 1332 may be coupled with a PCRF 1334 via a Gx reference point.

The PCRF 1334 is the policy and charging control element of the LTE CN 1322. The PCRF 1334 may be communicatively coupled to the app/content server 1338 to determine appropriate QoS and charging parameters for service flows. The PCRF 1332 may provision associated rules into a PCEF (via Gx reference point) with appropriate TFT and QCI.

In some embodiments, the CN 1320 may be a 5GC 1340. The 5GC 1340 may include an AUSF 1342, AMF 1344, SMF 1346, UPF 1348, NSSF 1350, NEF 1352, NRF 1354, PCF 1356, UDM 1358, and AF 1360 coupled with one another over interfaces (or "reference points") as shown. Functions of the elements of the 5GC 1340 may be briefly introduced as follows.

The AUSF 1342 may store data for authentication of UE 1302 and handle authentication-related functionality. The AUSF 1342 may facilitate a common authentication framework for various access types. In addition to communicating with other elements of the 5GC 1340 over reference points as shown, the AUSF 1342 may exhibit an Nausf service-based interface.

The AMF 1344 may allow other functions of the 5GC 1340 to communicate with the UE 1302 and the RAN 1304 and to subscribe to notifications about mobility events with respect to the UE 1302. The AMF 1344 may be responsible for registration management (for example, for registering UE 1302), connection management, reachability management, mobility management, lawful interception of AMF-related events, and access authentication and authorization. The AMF 1344 may provide transport for SM messages between the UE 1302 and the SMF 1346, and act as a transparent proxy for routing SM messages. AMF 1344 may also provide transport for SMS messages between UE 1302 and an SMSF. AMF 1344 may interact with the AUSF 1342 and the UE 1302 to perform various security anchor and context management functions. Furthermore, AMF 1344 may be a termination point of a RAN CP interface, which may include or be an N2 reference point between the RAN 1304 and the AMF 1344; and the AMF 1344 may be a termination point of NAS (N1) signaling, and perform NAS ciphering and integrity protection. AMF 1344 may also support NAS signaling with the UE 1302 over an N3 IWF interface.

The SMF 1346 may be responsible for SM (for example, session establishment, tunnel management between UPF 1348 and AN 1308); UE IP address allocation and management (including optional authorization); selection and control of UP function; configuring traffic steering at UPF 1348 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 1344 over N2 to AN 1308; and determining SSC mode of a session. SM may refer to management of a PDU session, and a PDU session or "session" may refer to a PDU connectivity service that provides or enables the exchange of PDUs between the UE 1302 and the data network 1336.

The UPF 1348 may act as an anchor point for intra-RAT and inter-RAT mobility, an external PDU session point of interconnect to data network 1336, and a branching point to support multi-homed PDU session. The UPF 1348 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 1348 may include an uplink classifier to support routing traffic flows to a data network.

The NSSF 1350 may select a set of network slice instances serving the UE 1302. The NSSF 1350 may also determine allowed NSSAI and the mapping to the subscribed S-NSSAIs, if needed. The NSSF 1350 may also determine the AMF set to be used to serve the UE 1302, or a list of candidate AMFs based on a suitable configuration and possibly by querying the NRF 1354. The selection of a set of network slice instances for the UE 1302 may be triggered by the AMF 1344 with which the UE 1302 is registered by interacting with the NSSF 1350, which may lead to a change of AMF. The NSSF 1350 may interact with the AMF 1344 via an N22 reference point; and may communicate with another NSSF in a visited network via an N31 reference point (not shown). Additionally, the NSSF 1350 may exhibit an Nnssf service-based interface.

The NEF 1352 may securely expose services and capabilities provided by 3GPP network functions for third party, internal exposure/re-exposure, AFs (e.g., AF 1360), edge computing or fog computing systems, etc. In such embodiments, the NEF 1352 may authenticate, authorize, or throttle the AFs. NEF 1352 may also translate information exchanged with the AF 1360 and information exchanged with internal network functions. For example, the NEF 1352 may translate between an AF-Service-Identifier and an internal 5GC information. NEF 1352 may also receive information from other NFs based on exposed capabilities of other NFs. This information may be stored at the NEF 1352 as structured data, or at a data storage NF using standardized interfaces. The stored information can then be re-exposed by the NEF 1352 to other NFs and AFs, or used for other purposes such as analytics. Additionally, the NEF 1352 may exhibit an Nnef service-based interface.

The NRF 1354 may support service discovery functions, receive NF discovery requests from NF instances, and provide the information of the discovered NF instances to the NF instances. NRF 1354 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 1354 may exhibit the Nnrf service-based interface.

The PCF 1356 may provide policy rules to control plane functions to enforce them, and may also support unified policy framework to govern network behavior. The PCF 1356 may also implement a front end to access subscription information relevant for policy decisions in a UDR of the UDM 1358. In addition to communicating with functions over reference points as shown, the PCF 1356 exhibit an Npcf service-based interface.

The UDM 1358 may handle subscription-related information to support the network entities' handling of communication sessions, and may store subscription data of UE 1302. For example, subscription data may be communicated via an N8 reference point between the UDM 1358 and the AMF 1344. The UDM 1358 may include two parts, an application front end and a UDR. The UDR may store subscription data and policy data for the UDM 1358 and the PCF 1356, and/or structured data for exposure and application data (including PFDs for application detection, application request information for multiple UEs 1302) for the NEF 1352. The Nudr service-based interface may be exhibited by the UDR 221 to allow the UDM 1358, PCF 1356, and NEF 1352 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 1358 may exhibit the Nudm service-based interface.

The AF 1360 may provide application influence on traffic routing, provide access to NEF, and interact with the policy framework for policy control.

In some embodiments, the 5GC 1340 may enable edge computing by selecting operator/3rd party services to be geographically close to a point that the UE 1302 is attached to the network. This may reduce latency and load on the network. To provide edge-computing implementations, the 5GC 1340 may select a UPF 1348 close to the UE 1302 and execute traffic steering from the UPF 1348 to data network 1336 via the N6 interface. This may be based on the UE subscription data, UE location, and information provided by the AF 1360. In this way, the AF 1360 may influence UPF (re)selection and traffic routing. Based on operator deployment, when AF 1360 is considered to be a trusted entity, the network operator may permit AF 1360 to interact directly with relevant NFs. Additionally, the AF 1360 may exhibit an Naf service-based interface.

The data network 1336 may represent various network operator services, Internet access, or third party services that may be provided by one or more servers including, for example, application/content server 1338.

FIG. 14 schematically illustrates a wireless network 1400 in accordance with various embodiments. The wireless network 1400 may include a UE 1402 in wireless communication with an AN 1404. The UE 1402 and AN 1404 may be similar to, and substantially interchangeable with, like-named components described elsewhere herein.

The UE 1402 may be communicatively coupled with the AN 1404 via connection 1406. The connection 1406 is illustrated as an air interface to enable communicative coupling, and can be consistent with cellular communications protocols such as an LTE protocol or a 5G NR protocol operating at mmWave or sub-6 GHz frequencies.

The UE 1402 may include a host platform 1408 coupled with a modem platform 1410. The host platform 1408 may include application processing circuitry 1412, which may be coupled with protocol processing circuitry 1414 of the modem platform 1410. The application processing circuitry 1412 may run various applications for the UE 1402 that source/sink application data. The application processing circuitry 1412 may further implement one or more layer operations to transmit/receive application data to/from a data network. These layer operations may include transport (for example UDP) and Internet (for example, IP) operations The protocol processing circuitry 1414 may implement one or more of layer operations to facilitate transmission or reception of data over the connection 1406. The layer operations implemented by the protocol processing circuitry 1414 may include, for example, MAC, RLC, PDCP, RRC and NAS operations.

The modem platform 1410 may further include digital baseband circuitry 1416 that may implement one or more layer operations that are "below" layer operations performed by the protocol processing circuitry 1414 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 1410 may further include transmit circuitry 1418, receive circuitry 1420, RF circuitry 1422, and RF front end (RFFE) 1424, which may include or connect to one or more antenna panels 1426. Briefly, the transmit circuitry 1418 may include a digital-to-analog converter, mixer, intermediate frequency (IF) components, etc.; the receive circuitry 1420 may include an analog-to-digital converter, mixer, IF components, etc.; the RF circuitry 1422 may include a low-noise amplifier, a power amplifier, power tracking components, etc.; RFFE 1424 may include filters (for example, surface/bulk acoustic wave filters), switches, antenna tuners, beamforming components (for example, phase-array antenna components), etc. The selection and arrangement of the components of the transmit circuitry 1418, receive circuitry 1420, RF circuitry 1422, RFFE 1424, and antenna panels 1426 (referred generically as "transmit/receive components") may be specific to details of a specific implementation such as, for example, whether communication is TDM or FDM, in mmWave or sub-6 ghz frequencies, etc. In some embodiments, the transmit/receive components may be arranged in multiple parallel transmit/receive chains, may be disposed in the same or different chips/modules, etc.

In some embodiments, the protocol processing circuitry 1414 may include one or more instances of control circuitry (not shown) to provide control functions for the transmit/receive components.

A UE reception may be established by and via the antenna panels 1426, RFFE 1424, RF circuitry 1422, receive circuitry 1420, digital baseband circuitry 1416, and protocol processing circuitry 1414. In some embodiments, the antenna panels 1426 may receive a transmission from the AN 1404 by receive-beamforming signals received by a plurality of antennas/antenna elements of the one or more antenna panels 1426.

A UE transmission may be established by and via the protocol processing circuitry 1414, digital baseband circuitry 1416, transmit circuitry 1418, RF circuitry 1422, RFFE 1424, and antenna panels 1426. In some embodiments, the transmit components of the UE 1404 may apply a spatial filter to the data to be transmitted to form a transmit beam emitted by the antenna elements of the antenna panels 1426.

Similar to the UE 1402, the AN 1404 may include a host platform 1428 coupled with a modem platform 1430. The host platform 1428 may include application processing circuitry 1432 coupled with protocol processing circuitry 1434 of the modem platform 1430. The modem platform may further include digital baseband circuitry 1436, transmit circuitry 1438, receive circuitry 1440, RF circuitry 1442, RFFE circuitry 1444, and antenna panels 1446. The components of the AN 1404 may be similar to and substantially interchangeable with like-named components of the UE 1402. In addition to performing data transmission/reception as described above, the components of the AN 1408 may perform various logical functions that include, for example, RNC functions such as radio bearer management, uplink and downlink dynamic radio resource management, and data packet scheduling.

FIG. 15 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 15 shows a diagrammatic representation of hardware resources 1500 including one or more processors (or processor cores) 1510, one or more memory/storage devices 1520, and one or more communication resources 1530, each of which may be communicatively coupled via a bus 1540 or other interface circuitry. For embodiments where node virtualization (e.g., NFV) is utilized, a hypervisor 1502 may be executed to provide an execution environment for one or more network slices/sub-slices to utilize the hardware resources 1500.

The processors 1510 may include, for example, a processor 1512 and a processor 1514. The processors 1510 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1520 may include main memory, disk storage, or any suitable combination thereof. The memory/storage devices 1520 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1530 may include interconnection or network interface controllers, components, or other suitable devices to communicate with one or more peripheral devices 1504 or one or more databases 1506 or other network elements via a network 1508. For example, the communication resources 1530 may include wired communication components (e.g., for coupling via USB, Ethernet, etc.), cellular communication components, NFC components, Bluetooth® (or Bluetooth® Low Energy) components, Wi-Fi® components, and other communication components.

Instructions 1550 may comprise software, a program, an application, an applet, an app, or other executable code for causing at least any of the processors 1510 to perform any one or more of the methodologies discussed herein. The instructions 1550 may reside, completely or partially, within at least one of the processors 1510 (e.g., within the processor's cache memory), the memory/storage devices 1520, or any suitable combination thereof. Furthermore, any portion of the instructions 1550 may be transferred to the hardware resources 1500 from any combination of the peripheral devices 1504 or the databases 1506. Accordingly, the memory of processors 1510, the memory/storage devices 1520, the peripheral devices 1504, and the databases 1506 are examples of computer-readable and machine-readable media.

Example Procedures

In some embodiments, the electronic device(s), network(s), system(s), chip(s) or component(s), or portions or implementations thereof, of FIGS. 13-15, or some other figure herein, may be configured to perform one or more processes, techniques, or methods as described herein, or portions thereof. One such process is depicted in FIG. 16. In embodiments, the process may be performed by a UE or a portion thereof. For example, the process may include, at 1602, receiving, from a gNodeB (gNB), configuration information to indicate a repetition window for a PRACH, wherein the repetition window includes a plurality of PRACH occasions. At 1604, the process may further include encoding a PRACH message for transmission with repetition in the respective PRACH occasions. In some embodiments, the configuration information may indicate a starting position and/or a number of PRACH repetitions (e.g., a number of the PRACH occasions) of the repetition window.

Figure 17:
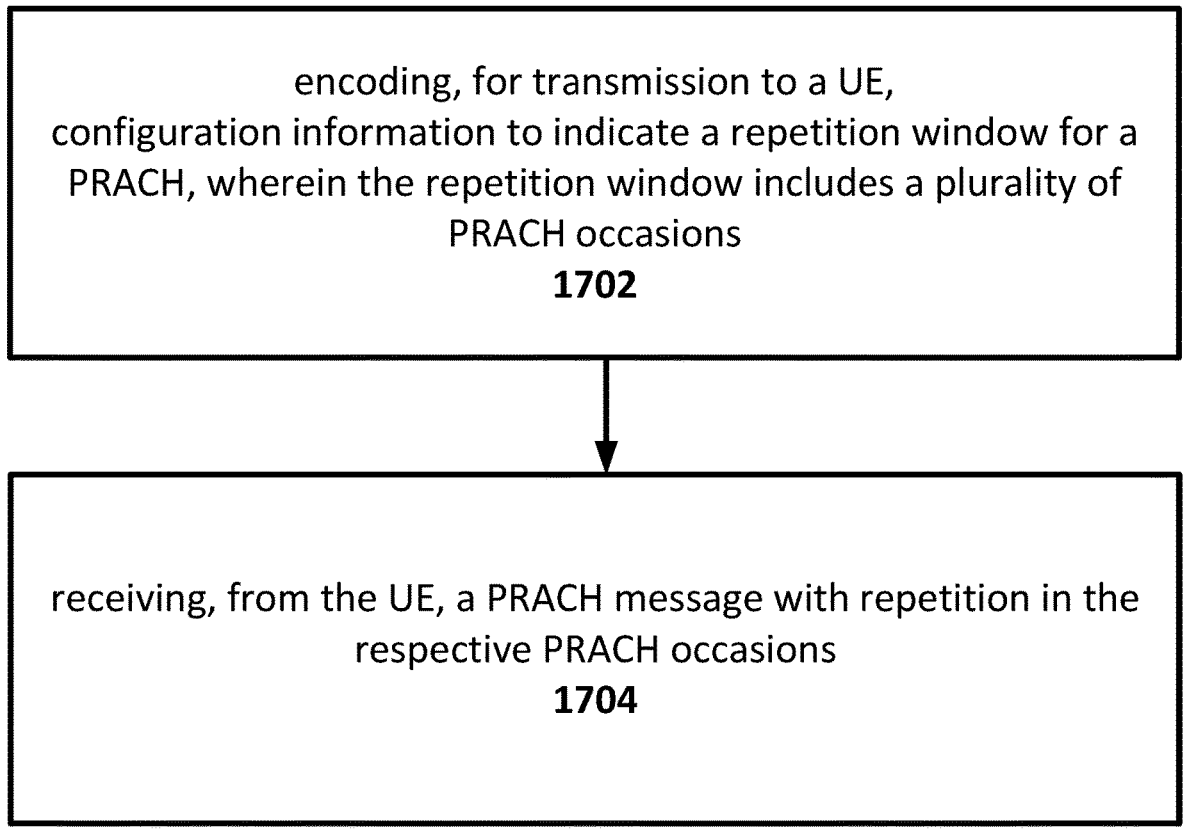

FIG. 17 illustrates another process in accordance with various embodiments. In some embodiments, the process may be performed by a gNB or a portion thereof. At 1702, the process may include encoding, for transmission to a UE, configuration information to indicate a repetition window for a PRACH, wherein the repetition window includes a plurality of PRACH occasions. At 1704, the process may further include receiving, from the UE, a PRACH message with repetition in the respective PRACH occasions. In some embodiments, the configuration information may indicate a starting position and/or a number of PRACH repetitions (e.g., a number of the PRACH occasions) of the repetition window.

FIG. 18 illustrates another process in accordance with various embodiments. In some embodiments, the process of FIG. 18 may be performed by a UE or a portion thereof. At 1802, the process may include receiving configuration information to configure repetitions of a CSI report on a PUSCH, wherein the CSI report includes an A-CSI report or a SP-CSI report. At 1804, the process may further include receiving a DCI to trigger the A-CSI report or activate the SP-CSI report. At 1806, the process may further include encoding, for transmission on the PUSCH, the CSI report with repetitions based on the configuration information and the DCI.

Figure 19:
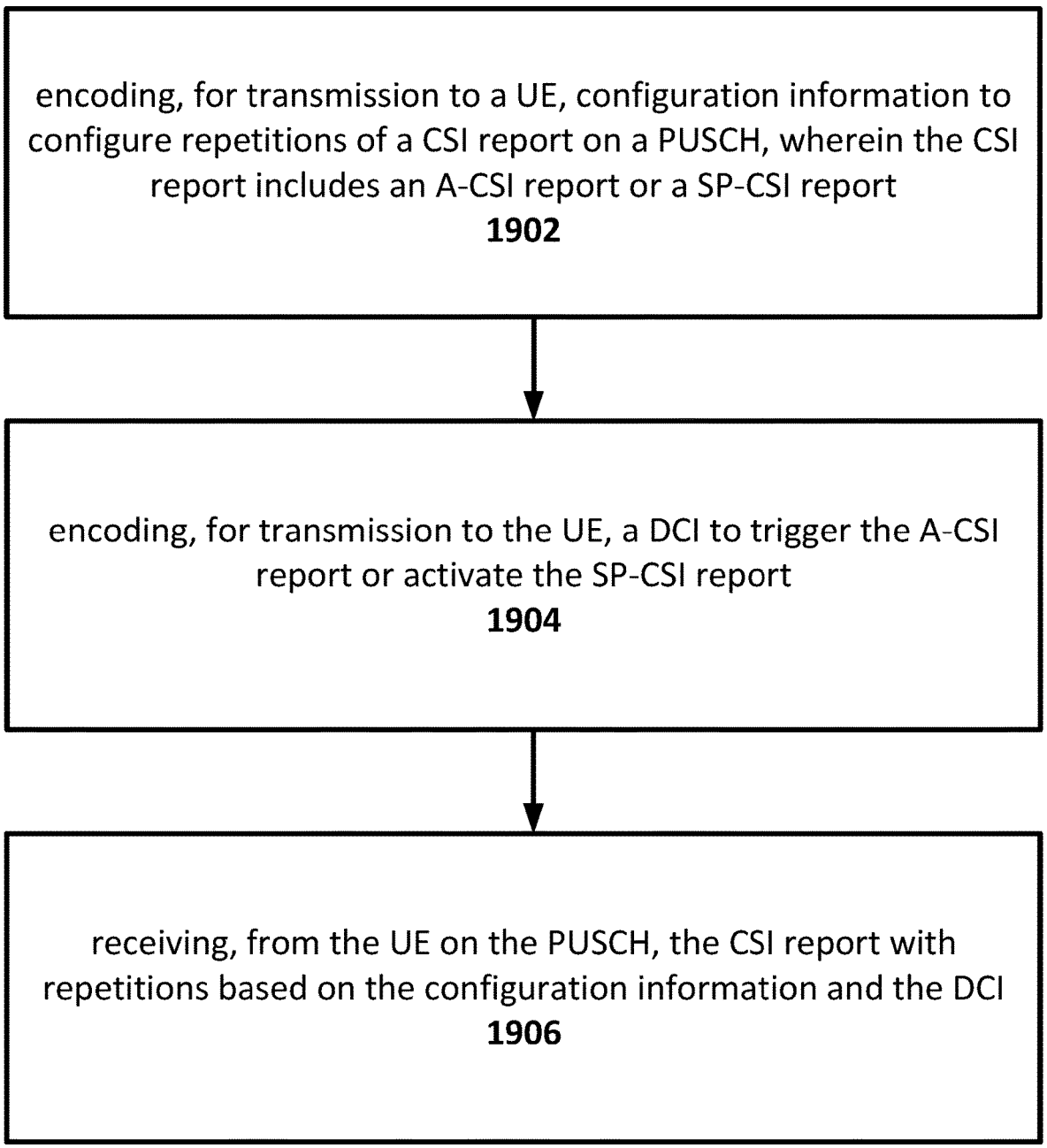

FIG. 19 illustrates another process in accordance with various embodiments. In some embodiments, the process may be performed by a gNB or a portion thereof. At 1902, the process may include encoding, for transmission to a UE, configuration information to configure repetitions of a CSI report on a PUSCH, wherein the CSI report includes an A-CSI report or a SP-CSI report. At 1804, the process may further include encoding, for transmission to the UE, a DCI to trigger the A-CSI report or activate the SP-CSI report. At 1806, the process may further include receiving, from the UE on the PUSCH, the CSI report with repetitions based on the configuration information and the DCI.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example A1 may include a method of wireless communication for a fifth generation (5G) or new radio (NR) system, the method comprising: receiving, by a UE from a gNodeB (gNB), a physical random access channel (PRACH) repetition window and a number of repetitions for PRACH; and Transmitting, by UE, the PRACH with repetition within the PRACH repetition window.

Example A2 may include the method of example A1 or some other example herein, wherein starting position of PRACH occasion and number of PRACH repetitions may be configured by higher layers via minimum system information (MR), remaining minimum system information (RMSI), other system information (OSI) or dedicated radio resource control (RRC) signalling Example A3 may include the method of example A1 or some other example herein, wherein PRACH repetition window may be configured by higher layers via MSI, RMSI (SIB1), OSI or RRC signalling, wherein the PRACH repetition window may be aligned with the association period or association pattern period for mapping SSB indexes to PRACH occasions.

Example A4 may include the method of example A1 or some other example herein, wherein PRACH repetition window may be configured as slot or symbol or frame offset and periodicity.

Example A5 may include the method of example A1 or some other example herein, wherein for physical downlink control channel (PDCCH) order PRACH transmission, the number of repetitions for PRACH repetitions may be configured by RRC signalling or dynamically indicated in the DCI or a combination thereof.

Example A6 may include the method of example A1 or some other example herein, wherein during the PRACH repetition window, same or different Tx beams may be applied for the transmission of PRACH during repetitions Example A7 may include the method of example A1 or some other example herein, wherein whether same or different Tx beams can be applied for the transmission of PRACH preamble during repetitions can be configured by higher layers via MSI, RMSI (SIB1), OSI or RRC signalling.

Example A8 may include the method of example A1 or some other example herein, wherein if multiple PRACH occasions with PRACH repetition window associated with same synchronization signal block (SSB) index are multiplexed in a frequency division multiplexing (FDM) manner, UE may only transmit the PRACH preamble in the PRACH occasion (RO) with lowest index or randomly select one RO for transmission of PRACH preamble.

Example A9 may include the method of example A1 or some other example herein, wherein UE shall associate a same SSB during repetition, wherein the transmit power or path-loss or reference signal received power is determined in accordance with the selected SSB index associated with the PRACH transmission Example A10 may include the method of example A1 or some other example herein, wherein different SSB indexes may be associated with different ROs for PRACH transmission, wherein the transmit power or path-loss or reference signal received power is determined in accordance with the selected SSB index associated with different ROs for PRACH repetitions Example A11 may include the method of example A1 or some other example herein, wherein when UE attempts to monitor random access response (RAR) during a RAR window, the window starts at the first symbol of the earliest CORESET the UE is configured to receive PDCCH for Type1-PDCCH common search space (CSS) set, that is at least one symbol, after the last symbol of the PRACH occasion corresponding to the last PRACH transmission.

Example A12 may include the method of example A1 or some other example herein, wherein separate PRACH occasions can be configured for PRACH repetition from legacy 4-step and/or 2-step RACH, respectively Example A13 may include the method of example A1 or some other example herein, wherein shared PRACH occasions, but different PRACH preambles can be configured for PRACH repetition from legacy 4-step and/or 2-step RACH, respectively.

Example A14 may include the method of example A1 or some other example herein, wherein within the set of preambles associated with a same SSB, PRACH preamble for PRACH repetition is allocated after contention based random access (CBRA) 2-step RACH.

Example A15 may include the method of example A1 or some other example herein, wherein PRACH repetition for 4-step RACH is allocated within the preambles for legacy CBRA 4-step RACH.

Example A16 may include the method of example A1 or some other example herein, wherein when measured Reference Signal Receive Power (RSRP) is less than or equal to a threshold which is configured by higher layers via MSI, RMSI (SIB1), OSI or RRC signalling, UE may employ PRACH repetition during PRACH repetition window.

Example A17 may include the method of example A1 or some other example herein, wherein when path-loss is greater than or equal to a threshold which is configured by higher layers via MSI, RMSI (SIB1), OSI or RRC signalling, UE may employ PRACH repetition during PRACH repetition window Example A18 may include the method of example A1 or some other example herein, wherein PRACH repetition may also apply for contention free random access (CFRA) procedure, wherein dedicated PRACH preamble for PRACH repetition, and PRACH repetition window (which may include starting position and number of repetitions or duration of PRACH repetitions) may be configured by dedicated RRC signalling.

Example A19 may include a method comprising: receiving, from a gNodeB (gNB), configuration information to indicate a repetition window and/or a number of repetitions for a physical random access channel (PRACH); and encoding a PRACH message for transmission with repetition within the repetition window.

Example A20 may include the method of example A19 or some other example herein, wherein the repetition window includes a plurality of PRACH occasions.

Example A21 may include the method of example A19-A20 or some other example herein, wherein the configuration information includes a starting position of a PRACH occasion associated with the repetition window.

Example A22 may include the method of example A19-A21 or some other example herein, wherein the configuration information is received via minimum system information (MSI), remaining minimum system information (RMSI), other system information (OSI), and/or dedicated radio resource control (RRC) signalling Example A23 may include the method of example A19-A22 or some other example herein, wherein the repetition window is aligned with an association period or an association pattern period for mapping SSB indexes to PRACH occasions.

Example A24 may include the method of example A19-A23 or some other example herein, wherein, to indicate the repetition window, the configuration information includes an offset and a periodicity.

Example A25 may include the method of example A24 or some other example herein, wherein the offset is a slot offset, a symbol offset, or a frame offset.

Example A26 may include the method of example A19-A25 or some other example herein, wherein the number of repetitions is for physical downlink control channel (PDCCH) order PRACH transmission Example A27 may include the method of example A26 or some other example herein, wherein the number of repetitions is received via RRC signalling and/or DCI.

Example A28 may include the method of example A19-A27 or some other example herein, wherein the repetitions of the PRACH message are transmitted with a same transmit beam or different transmit beams within the repetition window.

Example A29 may include the method of example A19-A28 or some other example herein, further comprising receiving an indication of whether the same beam or different beams are to be used for the repetitions of the PRACH message within the repetition window.

Example A30 may include the method of example A29 or some other example herein, wherein the indication is received via MSI, RMSI (e.g., SIB1), OSI, and/or RRC signalling.

Example A31 may include the method of example A19-A30 or some other example herein, further comprising, if multiple PRACH occasions with PRACH repetition window associated with same synchronization signal block (SSB) index are multiplexed in a frequency division multiplexing (FDM) manner, the PRACH message is transmitted in only one PRACH occasion of the repetition window.

Example A32 may include the method of example A31 or some other example herein, wherein the only one PRACH occasion is the PRACH occasion (RO) with a lowest index or a randomly selected PRACH occasion.

Example A33 may include the method of example A20-A32 or some other example herein, wherein the PRACH occasions for the repetitions are associated with a same SSB for determination of transmit power, path loss, and/or reference signal received power.

Example A34 may include the method of example A20-A32 or some other example herein, wherein the PRACH occasions for the repetitions are associated with different SSBs for determination of transmit power, path loss, and/or reference signal received power.

Example A35 may include the method of example A19-A34 or some other example herein, wherein the PRACH message is a PRACH preamble.

Example A36 may include the method of example A19-A35 or some other example herein, further comprising monitoring for a random access response (RAR) during a RAR window, wherein the RAR window starts at a first symbol of the earliest CORESET the UE is configured to receive PDCCH for Type1-PDCCH common search space (CSS) set, that is at least one symbol, after the last symbol of the PRACH occasion corresponding to the last PRACH transmission.

Example A37 may include the method of example A20-A36 or some other example herein, wherein separate PRACH occasions are configured for PRACH repetition 4-step RACH and 2-step RACH, respectively.

Example A38 may include the method of example A20-A36 or some other example herein, wherein the PRACH occasions are shared for 4-step RACH and 2-step RACH.

Example A39 may include the method of example A38 or some other example herein, wherein different PRACH preambles are configured for 4-step RACH and 2-step RACH.

Example A40 may include the method of example A19-A39 or some other example herein, wherein the PRACH message is repeated based on a determination that a measured Reference Signal Receive Power (RSRP) is less than or equal to a threshold.

Example A41 may include the method of example A19-A40 or some other example herein, wherein the PRACH message is repeated based on a determination that a measured path loss is less than or equal to a threshold.

Example A42 may include the method of example AA40-41 or some other example herein, further comprising receiving an indication of the threshold via MSI, RMSI (e.g., SIB1), OSI, and/or RRC signalling, Example A43 may include the method of example A19-A42 or some other example herein, wherein the configuration information is used for a contention free random access (CFRA) procedure.

Example A44 may include the method of example A19-A43 or some other example herein, wherein the method is performed by a UE or a portion thereof.

Example A45 may include a method comprising: encoding, for transmission to a UE, configuration information to indicate a repetition window and/or a number of repetitions for a physical random access channel (PRACH); and receiving, from the UE, a PRACH message with repetition within the repetition window.

Example A46 may include the method of example A45 or some other example herein, wherein the repetition window includes a plurality of PRACH occasions.

Example A47 may include the method of example A45-A46 or some other example herein, wherein the configuration information includes a starting position of a PRACH occasion associated with the repetition window.

Example A48 may include the method of example A45-A47 or some other example herein, wherein the configuration information is transmitted via minimum system information (MR), remaining minimum system information (RMSI), other system information (OSI), and/or dedicated radio resource control (RRC) signalling Example A49 may include the method of example A45-A48 or some other example herein, wherein the repetition window is aligned with an association period or an association pattern period for mapping SSB indexes to PRACH occasions.

Example A50 may include the method of example A45-A49 or some other example herein, wherein the method is performed by a gNB or a portion thereof.

Example B1 may include a method of wireless communication for a fifth generation (5G) or new radio (NR) system, the method comprising: receiving, by a UE from a gNodeB, an indication of a number of repetitions for a channel state information (CSI) report on a physical uplink shared channel (PUSCH); and transmitting, by the UE, the CSI report with repetition on the PUSCH.

Example B2 may include the method of example B1 or some other example herein, wherein the CSI report includes aperiodic CSI (A-CSI) report and/or semi-persistent CSI (SP-CSI) report.

Example B3 may include the method of example B1 or some other example herein, wherein whether repetition of CSI report on PUSCH is enabled can be configured by higher layers via minimum system information (MSI), remaining minimum system information (RMSI), other system information (OSI) or dedicated radio resource control (RRC) signalling.

Example B4 may include the method of example B1 or some other example herein, wherein number of repetitions for CSI report on PUSCH may be separately configured or indicated from the number of repetitions for PUSCH; wherein if not configured, the number of repetitions for CSI report on PUSCH can use the one which is configured or indicated for the PUS CH transmission.

Example B5 may include the method of example B1 or some other example herein, wherein for PUSCH repetition type A, number of repetitions for CSI report on PUSCH can be separately configured from puschAggregationFactor or separately indicated from numberofrepetitions as part of PUSCH time domain resource assignment (TDRA) indication by DCI formats 0_1 or 0_2

Example B6 may include the method of example B1 or some other example herein, wherein for PUSCH repetition type B, number of repetitions for CSI report on PUSCH can be separately indicated from numberofrepetitions as part of TDRA indication by DCI formats 0_1 or 0_2.

Example B7 may include the method of example B1 or some other example herein, wherein when A-CSI is multiplexed on PUSCH with transport block, the number of repetitions of A-CSI may follow the number of repetitions for PUSCH.

Example B8 may include the method of example B1 or some other example herein, wherein the numbers of repetitions for A-CSI on PUSCH may follow the value that may be provided separately from pusch-AggregationFactor or numberofrepetitions.

Example B9 may include the method of example B1 or some other example herein, wherein when A-CSI or SP-CSI is multiplexed on PUSCH with no transport block, the number of repetitions of CSI report on PUSCH may follow the number of repetitions which is configured for CSI report on PUSCH Example B10 may include the method of example B1 or some other example herein, wherein for PUSCH repetition type B, A-CSI or SP-CSI report may be carried on each nominal repetition.

Example B11 may include the method of example B1 or some other example herein, wherein for PUSCH repetition Type B, when a UE receives a DCI that schedules aperiodic CSI report(s) or activates semi-persistent CSI report(s) on PUSCH with no transport block by a CSI request field on a DCI, UE shall transmit A-CSI or SP-CSI reports on each actual repetition that is same as the indicated nominal repetition Example B12 may include the method of example B1 or some other example herein, wherein when one nominal repetition is segmented into more than one actual repetition due to across slot boundary, conflict with invalid symbols or semi-static DL symbols, actual repetitions are dropped.

Example B13 may include the method of example B1 or some other example herein, wherein for PUSCH repetition Type B, when a UE receives a DCI that schedules aperiodic CSI report(s) or activates semi-persistent CSI report(s) on PUSCH with transport block by a CSI request field on a DCI, UE shall transmit A-CSI or SP-CSI reports with transport block on each actual repetition that is same as the indicated nominal repetition.

Example B14 may include the method of example B1 or some other example herein, wherein UE shall transmit only transport block without A-CSI or SP-CSI report on actual repetition when actual repetition is not same as nominal repetition.

Example B15 may include the method of example B1 or some other example herein, wherein for PUSCH repetition type B, when the number of bits for CSI report is less than or equal to 11 bits, CSI report is carried in each actual repetition regardless of whether transport block is present on PUSCH.

Example B16 may include the method of example B1 or some other example herein, wherein for PUSCH repetition type B, part of symbols from nominal repetition may be repeated and transmitted in actual repetition.

Example B17 may include the method of example B1 or some other example herein, wherein for PUSCH repetition type B, CSI report is carried in each actual repetition regardless of whether transport block is present on PUSCH.

Example B18 may include the method of example B1 or some other example herein, wherein the total number of REs for PUSCH for determination of the REs for A-CSI/SP-CSI part 1 and part 2 may be calculated from the nominal repetition length Example B19 may include the method of example B1 or some other example herein, wherein the total number of REs for PUSCH for determination of the REs for A-CSI/SP-CSI part 1 and part 2 may be calculated from an actual repetition length.

Example B20 may include a method comprising: receiving configuration information to indicate a number of repetitions for a channel state information (CSI) report on a physical uplink shared channel (PUSCH); and encoding, for transmission on the PUSCH, the CSI report with the indicated number of repetitions.

Example B21 may include the method of example B20 or some other example herein, wherein the CSI report includes an aperiodic CSI (A-CSI) report and/or a semi-persistent CSI (SP-CSI) report.

Example B22 may include the method of example B20-B21 or some other example herein, wherein the configuration information is received via minimum system information (MR), remaining minimum system information (RMSI), other system information (OSI), and/or dedicated radio resource control (RRC) signalling.

Example B23 may include the method of example B20-B22 or some other example herein, wherein the number of repetitions corresponds to a number of repetitions for a PUSCH.

Example B24 may include the method of example B20-B23 or some other example herein, wherein for PUSCH repetition type A, the indication of the number of repetitions is separate from a pusch-AggregationFactor and/or a numberofrepetitions as part of PUSCH time domain resource assignment (TDRA) indication by DCI formats 0_1 or 0_2.

Example B25 may include the method of example B20-B24 or some other example herein, wherein for PUSCH repetition type B, the indication of the number of repetitions for CSI report is separate from a numberofrepetitions as part of TDRA indication by DCI formats 0_1 or 0_2.

Example B26 may include the method of example B20-B25 or some other example herein, wherein the CSI is A-CSI multiplexed on the PUSCH with a transport block, and wherein the number of repetitions of the A-CSI is the same as a number of repetitions for the PUSCH.

Example B27 may include the method of example B20-B26 or some other example herein, wherein the method is performed by a UE or a portion thereof.

Example B28 may include a method comprising: encoding, for transmission to a user equipment (UE), configuration information to indicate a number of repetitions for a channel state information (CSI) report on a physical uplink shared channel (PUSCH); and receiving the CSI report on the PUSCH with the indicated number of repetitions.

Example B29 may include the method of example B28 or some other example herein, wherein the CSI report includes an aperiodic CSI (A-CSI) report and/or a semi-persistent CSI (SP-CSI) report.

Example B30 may include the method of example B28-B29 or some other example herein, wherein the configuration information is transmitted via minimum system information (MR), remaining minimum system information (RMSI), other system information (OSI), and/or dedicated radio resource control (RRC) signalling.

Example B31 may include the method of example B28-B30 or some other example herein, wherein the number of repetitions corresponds to a number of repetitions for a PUSCH.

Example B32 may include the method of example B28-B31 or some other example herein, wherein for PUSCH repetition type A, the indication of the number of repetitions is separate from a pusch-AggregationFactor and/or a numberofrepetitions as part of PUSCH time domain resource assignment (TDRA) indication by DCI formats 0_1 or 0_2.

Example B33 may include the method of example B28-B32 or some other example herein, wherein for PUSCH repetition type B, the indication of the number of repetitions for CSI report is separate from a numberofrepetitions as part of TDRA indication by DCI formats 0_1 or 0_2.

Example B34 may include the method of example B28-B33 or some other example herein, wherein the CSI is A-CSI multiplexed on the PUSCH with a transport block, and wherein the number of repetitions of the A-CSI is the same as a number of repetitions for the PUSCH.

Example B35 may include the method of example B28-B34 or some other example herein, wherein the method is performed by a gNB or a portion thereof.

Example C1 may include one or more non-transitory computer-readable media (NTCRM) having instructions, stored thereon, that when executed by one or more processors of a user equipment (UE) cause the UE to: receive configuration information to configure repetitions of a channel state information (CSI) report on a physical uplink shared channel (PUSCH), wherein the CSI report includes an aperiodic CSI (A-CSI) report or a semi-persistent CSI (SP-CSI) report; receive a DCI to trigger the A-CSI report or activate the SP-CSI report; and encode, for transmission on the PUSCH, the CSI report with repetitions based on the configuration information and the DCI.

Example C2 may include the one or more NTCRM of example C1, wherein the configuration information indicates a number of the repetitions.

Example C3 may include the one or more NTCRM of example C2, wherein the number of repetitions is indicated separately from a number of repetitions of the PUSCH.

Example C4 may include the one or more NTCRM of example C1, wherein the configuration information is received via one or more of minimum system information (MR), remaining minimum system information (RMSI), other system information (OSI), or dedicated radio resource control (RRC) signaling.

Example C5 may include the one or more NTCRM of example C1, wherein the configuration information is configured per DCI format.

Example C6 may include the one or more NTCRM of example C1, wherein the CSI report is the A-CSI report and is multiplexed on the PUSCH with a transport block, and wherein a number of the repetitions of the A-CSI is the same as a number of repetitions for the PUSCH.

Example C7 may include one or more non-transitory computer-readable media (NTCRM) having instructions, stored thereon, that when executed by one or more processors of a next generation Node B (gNB) cause the gNB to: encode, for transmission to a user equipment (UE), configuration information to configure repetitions of a channel state information (CSI) report on a physical uplink shared channel (PUSCH), wherein the CSI report includes an aperiodic CSI (A-CSI) report or a semi-persistent CSI (SP-CSI) report; encode, for transmission to the UE, a DCI to trigger the A-CSI report or activate the SP-CSI report; and receive, from the UE on the PUSCH, the CSI report with repetitions based on the configuration information and the DCI.

Example C8 may include the one or more NTCRM of example C7, wherein the configuration information indicates a number of the repetitions.

Example C9 may include the one or more NTCRM of example C8, wherein the number of repetitions is indicated separately from a number of repetitions of the PUSCH.

Example C10 may include the one or more NTCRM of example C7, wherein the configuration information is transmitted via one or more of minimum system information (MSI), remaining minimum system information (RMSI), other system information (OSI), or dedicated radio resource control (RRC) signaling.

Example C11 may include the one or more NTCRM of example C7, wherein the configuration information is configured per DCI format.

Example C12 may include the one or more NTCRM of example C7, wherein the CSI report is the A-CSI report and is multiplexed on the PUSCH with a transport block, and wherein a number of the repetitions of the A-CSI is the same as a number of repetitions for the PUSCH.

Example C13 may include one or more non-transitory computer-readable media (NTCRM) having instructions, stored thereon, that when executed by one or more processors of a user equipment (UE) cause the UE to: receive, from a gNodeB (gNB), configuration information to indicate a repetition window for a physical random access channel (PRACH), wherein the repetition window includes a plurality of PRACH occasions; and encode a PRACH message for transmission with repetition in the respective PRACH occasions.

Example C14 may include the one or more NTCRM of example C13, wherein the configuration information indicates a starting position and a number of PRACH repetitions.

Example C15 may include the one or more NTCRM of example C13, wherein the configuration information is received via one or more of minimum system information (MSI), remaining minimum system information (RMSI), other system information (OSI), or dedicated radio resource control (RRC) signaling.

Example C16 may include the one or more NTCRM of example C13, wherein, to indicate the repetition window, the configuration information includes an offset and a periodicity, wherein the offset is a slot offset, a symbol offset, or a frame offset.

Example C17 may include the one or more NTCRM of example C13, wherein the configuration information includes an indication of whether the same beam or different beams are to be used for the repetitions of the PRACH message within the repetition window.

Example C18 may include the one or more NTCRM of example C13, wherein if the plurality of PRACH occasions in the repetition window associated a same synchronization signal block (SSB) index are multiplexed in a frequency division multiplexing (FDM) manner, the PRACH message is transmitted in only one PRACH occasion of the repetition window.

Example C19 may include the one or more NTCRM of example C13, wherein the PRACH occasions for the repetitions are associated with a same synchronization signal block (SSB) for determination of transmit power, path loss, and reference signal received power.

Example C20 may include the one or more NTCRM of example C13, wherein the PRACH occasions for the repetitions are associated with different synchronization signal blocks (SSBs) for determination of transmit power, path loss, and reference signal received power.

Example Z01 may include an apparatus comprising means to perform one or more elements of a method described in or related to any of examples A1-A50, B1-B35, C1-C20, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples A1-A50, B1-B35, C1-C20, or any other method or process described herein.

Example Z03 may include an apparatus comprising logic, modules, or circuitry to perform one or more elements of a method described in or related to any of examples A1-A50, B1-B35, C1-C20, or any other method or process described herein.

Example Z04 may include a method, technique, or process as described in or related to any of examples A1-A50, B1-B35, C1-C20, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples A1-A50, B1-B35, C1-C20, or portions thereof.

Example Z06 may include a signal as described in or related to any of examples A1-A50, B1-B35, C1-C20, or portions or parts thereof.

Example Z07 may include a datagram, packet, frame, segment, protocol data unit (PDU), or message as described in or related to any of examples A1-A50, B1-B35, C1-C20, or portions or parts thereof, or otherwise described in the present disclosure.

Example Z08 may include a signal encoded with data as described in or related to any of examples A1-A50, B1-B35, C1-C20, or portions or parts thereof, or otherwise described in the present disclosure.

Example Z09 may include a signal encoded with a datagram, packet, frame, segment, protocol data unit (PDU), or message as described in or related to any of examples A1-A50, B1-B35, C1-C20, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples A1-A50, B1-B35, C1-C20, or portions thereof.

Example Z11 may include a computer program comprising instructions, wherein execution of the program by a processing element is to cause the processing element to carry out the method, techniques, or process as described in or related to any of examples A1-A50, B1-B35, C1-C20, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

ABBREVIATIONS

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

| | | |
|---|---|---|
| 3GPP Third Generation Partnership Project | ASN.1 Abstract Syntax Notation One | Certification Authority |
| 4G Fourth Generation | AUSF Authentication Server Function | CAPEX CAPital EXpenditure |
| 5G Fifth Generation | | |
| 5GC 5G Core network | AWGN Additive White Gaussian Noise | CBRA Contention Based Random Access |
| ACK Acknowledgement | | |
| AF Application Function | BAP Backhaul Adaptation Protocol | CC Component Carrier, Country Code, Cryptographic Checksum |
| AM Acknowledged Mode | | |
| | BCH Broadcast Channel | |
| AMBR Aggregate Maximum Bit Rate | BER Bit Error Ratio | CCA Clear Channel Assessment |
| | BFD Beam Failure Detection | |
| AMF Access and Mobility Management Function | | CCE Control Channel Element |
| | BLER Block Error Rate | |
| | BPSK Binary Phase Shift Keying | CCCH Common Control Channel |
| AN Access Network | | |
| ANR Automatic | BRAS Broadband Remote Access Server | CE Coverage Enhancement |

-continued

Neighbour Relation
AP Application Protocol, Antenna Port, Access Point
API Application Programming Interface
APN Access Point Name
ARP Allocation and Retention Priority
ARQ Automatic Repeat Request
AS Access Stratum
CIR Carrier to Interference Ratio
CK Cipher Key
CM Connection Management, Conditional Mandatory
CMAS Commercial Mobile Alert Service
CMD Command
CMS Cloud Management System
CO Conditional Optional
CoMP Coordinated Multi-Point
CORESET Control Resource Set
COTS Commercial Off-The-Shelf
CP Control Plane, Cyclic Prefix, Connection Point
CPD Connection Point Descriptor
CPE Customer Premise Equipment
CPICHCommon Pilot Channel
CQI Channel Quality Indicator
DM-RS, DMRS Demodulation Reference Signal
DN Data network
DRB Data Radio Bearer
DRS Discovery Reference Signal
DRX Discontinuous Reception
DSL Domain Specific Language. Digital Subscriber Line
DSLAM DSL Access Multiplexer
DwPTS Downlink Pilot Time Slot
E-LAN Ethernet Local Area Network
E2E End-to-End
ECCA extended clear channel assessment, extended CCA
ECCE Enhanced Control Channel Element, Enhanced CCE
ED Energy Detection
EDGE Enhanced Datarates for GSM Evolution (GSM Evolution)
EGMF Exposure Governance
FACCH/H Fast Associated Control Channel/Half rate
FACH Forward Access Channel
FAUSCH Fast Uplink BSS Business Support System
BS Base Station
BSR Buffer Status Report
BW Bandwidth
BWP Bandwidth Part
C-RNTI Cell Radio Network Temporary Identity
CA Carrier Aggregation,
CPU CSI processing unit, Central Processing Unit
C/R Command/Response field bit
CRAN Cloud Radio Access Network, Cloud RAN
CRB Common Resource Block
CRC Cyclic Redundancy Check
CRI Channel-State Information Resource Indicator, CSI-RS Resource Indicator
C-RNTI Cell RNTI
CS Circuit Switched
CSAR Cloud Service Archive
CSI Channel-State Information
CSI-IM CSI Interference Measurement
CSI-RS CSI Reference Signal
CSI-RSRP CSI reference signal received power Management Function
EGPRS Enhanced GPRS
EIR Equipment Identity Register
eLAA enhanced Licensed Assisted Access, enhanced LAA
EM Element Manager
eMBB Enhanced Mobile Broadband
EMS Element Management System
eNB evolved NodeB, E-UTRAN Node B
EN-DC E-UTRA-NR Dual Connectivity
EPC Evolved Packet Core
EPDCCH enhanced PDCCH, enhanced Physical Downlink Control Cannel
EPRE Energy per resource element
EPS Evolved Packet System
FN Frame Number
FPGA Field-Programmable Gate Array
FR Frequency Range
G-RNTI GERAN Radio Network CDM Content Delivery Network
CDMA Code-Division Multiple Access
CFRA Contention Free Random Access
CG Cell Group
CI Cell Identity
CID Cell-ID (e.g., positioning method)
CIM Common Information Model
CSI-RSRQ CSI reference signal received quality
CSI-SINR CSI signal-to-noise and interference ratio
CSMA Carrier Sense Multiple Access
CSMA/CA CSMA with collision avoidance
CSS Common Search Space, Cell-specific Search Space
CTS Clear-to-Send
CW Codeword
CWS Contention Window Size
D2D Device-to-Device
DC Dual Connectivity, Direct Current
DCI Downlink Control Information
DF Deployment Flavour
DL Downlink
DMTF Distributed Management Task Force
DPDK Data Plane Development Kit
EREG enhanced REG, enhanced resource element groups
ETSI European Telecommunications Standards Institute
ETWS Earthquake and Tsunami Warning System
eUICC embedded UICC, embedded Universal Integrated Circuit Card
E-UTRA Evolved UTRA
E-UTRAN Evolved UTRAN
EV2X Enhanced V2X
F1AP F1 Application Protocol
F1-C F1 Control plane interface
F1-U F1 User plane interface
FACCH Fast Associated Control CHannel
FACCH/F Fast Associated Control Channel/Full rate
GNSS Global Navigation Satellite System
GPRS General Packet Radio Service
GSM Global System for Mobile Communications, Groupe Spécial -continued

| | | |
|---|---|---|
| Signalling Channel | Temporary Identity | Mobile |
| FB Functional Block | GERAN | GTP GPRS Tunneling |
| FBI Feedback | GSM EDGE RAN, | Protocol |
| Information | GSM EDGE Radio | GTP-UGPRS Tunnelling |
| FCC Federal | Access Network | Protocol for User |
| Communications | GGSN Gateway GPRS | Plane |
| Commission | Support Node | GTS Go To Sleep Signal |
| FCCH Frequency | GLONASS | (related to WUS) |
| Correction CHannel | GLObal'naya | GUMMEI Globally |
| FDD Frequency Division | NAvigatsionnaya | Unique MME Identifier |
| Duplex | Sputnikovaya | GUTI Globally Unique |
| FDM Frequency Division | Sistema (Engl.: | Temporary UE Identity |
| Multiplex | Global Navigation | HARQ Hybrid ARQ, |
| FDMAFrequency Division | Satellite System) | Hybrid Automatic |
| Multiple Access | gNB Next Generation | Repeat Request |
| FE Front End | NodeB | HANDO Handover |
| FEC Forward Error | gNB-CU gNB- | HFN HyperFrame |
| Correction | centralized unit, Next | Number |
| FFS For Further Study | Generation NodeB | HHO Hard Handover |
| FFT Fast Fourier | centralized unit | HLR Home Location |
| Transformation | gNB-DU gNB- | Register |
| feLAA further enhanced | distributed unit, Next | HN Home Network |
| Licensed Assisted | Generation NodeB | HO Handover |
| Access, further | distributed unit | IMPU IP Multimedia |
| enhanced LAA | IDFT Inverse Discrete | PUblic identity |
| HPLMN Home | Fourier Transform | IMS IP Multimedia |
| Public Land Mobile | IE Information | Subsystem |
| Network | element | IMSI International |
| HSDPA High Speed | IBE In-Band Emission | Mobile Subscriber |
| Downlink Packet | IEEE Institute of | Identity |
| Access | Electrical and Electronics | IoT Internet of Things |
| HSN Hopping Sequence | Engineers | IP Internet Protocol |
| Number | IEI Information | Ipsec IP Security, |
| HSPA High Speed Packet | Element Identifier | Internet Protocol |
| Access | IEIDL Information | Security |
| HSS Home Subscriber | Element Identifier | IP-CAN IP- |
| Server | Data Length | Connectivity Access |
| HSUPA High Speed | IETF Internet | Network |
| Uplink Packet Access | Engineering Task | IP-M IP Multicast |
| HTTP Hyper Text | Force | IPv4 Internet Protocol |
| Transfer Protocol | IF Infrastructure | Version 4 |
| HTTPS Hyper Text | IM Interference | IPv6 Internet Protocol |
| Transfer Protocol | Measurement, | Version 6 |
| Secure (https is | Intermodulation, IP | IR Infrared |
| http/1.1 over SSL, | Multimedia | IS In Sync |
| i.e. port 443) | IMC IMS Credentials | IRP Integration |
| I-Block Information | IMEI International | Reference Point |
| Block | Mobile Equipment | ISDN Integrated Services |
| ICCID Integrated Circuit | Identity | Digital Network |
| Card Identification | IMGI International | ISIM IM Services |
| IAB Integrated Access | mobile group identity | Identity Module |
| and Backhaul | IMPI IP Multimedia | ISO International |
| ICIC Inter-Cell | Private Identity | Organisation for |
| Interference | L2 Layer 2 (data link | Standardisation |
| Coordination | layer) | LWIP LTE/WLAN Radio |
| ID Identity, identifier | L3 Layer 3 (network | Level Integration with |
| ISP Internet Service | layer) | IPsec Tunnel |
| Provider | LAA Licensed Assisted | LTE Long Term |
| IWF Interworking- | Access | Evolution |
| Function | LAN Local Area | M2M Machine-to- |
| I-WLAN | Network | Machine |
| Interworking | LBT Listen Before Talk | MAC Medium Access |
| WLAN | LCM LifeCycle | Control (protocol |
| Constraint length of | Management | layering context) |
| the convolutional code, | LCR Low Chip Rate | MAC Message |
| USIM Individual key | LCS Location Services | authentication code |
| kB Kilobyte (1000 | LCID Logical | (security/encryption |
| bytes) | Channel ID | context) |
| kbps kilo-bits per second | LI Layer Indicator | MAC-A MAC used |
| Kc Ciphering key | LLC Logical Link | for authentication and |
| Ki Individual | Control, Low Layer | key agreement (TSG T |
| subscriber | Compatibility | WG3 context) |
| authentication key | LPLMN Local | MAC-IMAC used for data |
| KPI Key Performance | PLMN | integrity of |
| Indicator | LPP LTE Positioning | signalling messages (TSG |
| KQI Key Quality | Protocol | T WG3 context) |
| Indicator | LSB Least Significant | MANO |

| | | |
|---|---|---|
| KSI Key Set Identifier | Bit | Management and |
| ksps kilo-symbols per second | LTE Long Term Evolution | Orchestration MBMS Multimedia |
| KVM Kernel Virtual Machine | LWA LTE-WLAN aggregation | Broadcast and Multicast Service |
| L1 Layer 1 (physical layer) | MM Mobility Management | MBSFN Multimedia Broadcast multicast |
| L1-RSRP Layer 1 reference signal received power | MME Mobility Management Entity MN Master Node | MSC Mobile Switching Centre MSI Minimum System |
| service Single Frequency Network | MnS Management Service | Information, MCH Scheduling |
| MCC Mobile Country Code | MO Measurement Object, Mobile | MSID Mobile Station Identifier |
| MCG Master Cell Group MCOT Maximum Channel Occupancy Time | Originated MPBCH MTC Physical Broadcast | MSIN Mobile Station Identification Number |
| MCS Modulation and coding scheme | CHannel MPDCCH MTC | MSISDN Mobile Subscriber ISDN |
| MDAF Management Data Analytics Function | Physical Downlink Control CHannel | Number MT Mobile Terminated, |
| MDAS Management Data Analytics Service | MPDSCH MTC Physical Downlink | Mobile Termination MTC Machine-Type |
| MDT Minimization of Drive Tests | Shared CHannel MPRACH MTC | Communications mMTCmassive MTC, |
| ME Mobile Equipment MeNB master eNB | Physical Random Access CHannel | massive Machine-Type Communications |
| MER Message Error Ratio | MPUSCH MTC Physical Uplink Shared | MU-MIMO Multi User MIMO |
| MGL Measurement Gap Length | Channel MPLS MultiProtocol | MWUS MTC wake-up signal, MTC |
| MGRP Measurement Gap Repetition Period | Label Switching MS Mobile Station | WUS NACK Negative |
| MIB Master Information Block, Management Information Base | MSB Most Significant Bit NMS Network | Acknowledgement NAI Network Access Identifier |
| MIMO Multiple Input Multiple Output | Management System N-PoP Network Point of | NRF NF Repository Function |
| MLC Mobile Location Centre | Presence NMIB, N-MIB | NRS Narrowband Reference Signal |
| NAS Non-Access Stratum, Non- Access Stratum layer | Narrowband MIB NPBCH Narrowband Physical Broadcast | NS Network Service NSA Non-Standalone operation mode |
| NCT Network Connectivity Topology | CHannel NPDCCH Narrowband | NSD Network Service Descriptor |
| NC-JT Non-Coherent Joint Transmission | Physical Downlink Control CHannel NPDSCH Narrowband | NSR Network Service Record |
| NEC Network Capability Exposure | Physical Downlink Shared CHannel | NSSAINetwork Slice Selection Assistance |
| NE-DC NR-E-UTRA Dual Connectivity | NPRACH Narrowband Physical Random Access CHannel | Information S-NNSAI Single-NSSAI |
| NEF Network Exposure Function | NPUSCH Narrowband Physical Uplink | NSSF Network Slice Selection Function |
| NF Network Function NFP Network Forwarding Path | Shared CHannel NPSS Narrowband Primary | NW Network NWUSNarrowband wake-up signal, Narrowband |
| NFPD Network Forwarding Path Descriptor | Synchronization Signal NSSS Narrowband | WUS NZP Non-Zero Power O&M Operation and |
| NFV Network Functions Virtualization | Secondary Synchronization | Maintenance ODU2 Optical channel |
| NFVI NFV Infrastructure NFVO NFV Orchestrator | Signal NR New Radio, | Data Unit - type 2 OFDM Orthogonal |
| NG Next Generation, Next Gen | Neighbour Relation PCF Policy Control | Frequency Division Multiplexing |
| NGEN-DC NG-RAN E-UTRA-NR Dual Connectivity | Function PCRF Policy Control and Charging Rules | PLMN Public Land Mobile Network PIN Personal |
| NM Network Manager OFDMA Orthogonal Frequency Division Multiple Access | Function PDCP Packet Data Convergence Protocol, Packet Data | Identification Number PM Performance Measurement PMI Precoding Matrix |
| OOB Out-of-band OOS Out of Sync | Convergence Protocol layer | Indicator PNF Physical Network |
| OPEX OPerating EXpense | PDCCH Physical | Function |

| | | |
|---|---|---|
| OSI Other System Information | Downlink Control Channel | PNFD Physical Network Function Descriptor |
| OSS Operations Support System | PDCP Packet Data Convergence Protocol | PNFR Physical Network Function Record |
| OTA over-the-air | PDN Packet Data Network, Public Data Network | POC PTT over Cellular |
| PAPR Peak-to-Average Power Ratio | | PP, PTP Point-to-Point |
| PAR Peak to Average Ratio | PDSCH Physical Downlink Shared Channel | PPP Point-to-Point Protocol |
| PBCH Physical Broadcast Channel | PDU Protocol Data Unit | PRACH Physical RACH |
| PC Power Control, Personal Computer | PEI Permanent Equipment Identifiers | PRB Physical resource block |
| PCC Primary Component Carrier, Primary CC | PFD Packet Flow Description | PRG Physical resource block group |
| | P-GW PDN Gateway | ProSe Proximity Services, Proximity-Based Service |
| PCell Primary Cell | PHICH Physical hybrid-ARQ indicator channel | |
| PCI Physical Cell ID, Physical Cell Identity | | PRS Positioning Reference Signal |
| | PHY Physical layer | |
| PCEF Policy and Charging Enforcement Function | PUSCH Physical Uplink Shared Channel | RAR Random Access Response |
| | | RAT Radio Access Technology |
| | QAM Quadrature Amplitude Modulation | |
| PRR Packet Reception Radio | | RAU Routing Area Update |
| | QCI QoS class of identifier | |
| PS Packet Services | | RB Resource block, Radio Bearer |
| PSBCH Physical Sidelink Broadcast Channel | QCL Quasi co-location | |
| | QFI QoS Flow ID, QoS Flow Identifier | RBG Resource block group |
| PSDCH Physical Sidelink Downlink Channel | QoS Quality of Service | REG Resource Element Group |
| | QPSK Quadrature (Quaternary) Phase Shift Keying | Rel Release |
| PSCCH Physical Sidelink Control Channel | | REQ REQuest |
| | QZSS Quasi-Zenith Satellite System | RF Radio Frequency |
| | | RI Rank Indicator |
| PSFCH Physical Sidelink Feedback Channel | RA-RNTI Random Access RNTI | RIV Resource indicator value |
| | RAB Radio Access Bearer, Random Access Burst | RL Radio Link |
| PSSCH Physical Sidelink Shared Channel | | RLC Radio Link Control, Radio Link Control layer |
| | RACH Random Access Channel | |
| PSCell Primary SCell | | RLC AM RLC Acknowledged Mode |
| PSS Primary Synchronization Signal | RADIUS Remote Authentication Dial In User Service | RLC UM RLC Unacknowledged Mode |
| PSTN Public Switched Telephone Network | RAN Radio Access Network | RLF Radio Link Failure |
| | | RLM Radio Link Monitoring |
| PT-RS Phase-tracking reference signal | RAND RANDom number (used for authentication) | RLM-RS Reference Signal for RLM |
| PTT Push-to-Talk | RTP Real Time Protocol | SCell Secondary Cell |
| PUCCH Physical Uplink Control Channel | RTS Ready-To-Send | SC-FDMA Single Carrier Frequency Division Multiple Access |
| | RTT Round Trip Time | |
| RM Registration Management | Rx Reception, Receiving, Receiver | |
| RMC Reference Measurement Channel | S1AP S1 Application Protocol | SCG Secondary Cell Group |
| RMSI Remaining MSI, Remaining Minimum System Information | S1-MME S1 for the control plane | SCM Security Context Management |
| | S1-U S1 for the user plane | SCS Subcarrier Spacing |
| RN Relay Node | | SCTP Stream Control Transmission Protocol |
| RNC Radio Network Controller | S-GW Serving Gateway | |
| | S-RNTI SRNC Radio Network Temporary Identity | |
| RNL Radio Network Layer | | SDAP Service Data Adaptation Protocol, Service Data Adaptation Protocol layer |
| RNTI Radio Network Temporary Identifier | S-TMSI SAE Temporary Mobile Station Identifier | |
| ROHC RObust Header Compression | SA Standalone operation mode | SDL Supplementary Downlink |
| RRC Radio Resource Control, Radio Resource Control layer | SAE System Architecture Evolution | SDNF Structured Data Storage Network Function |
| RRM Radio Resource Management | SAP Service Access Point | SDP Session Description Protocol |
| RS Reference Signal | SAPD Service Access Point Descriptor | SDSF Structured Data Storage Function |
| RSRP Reference Signal Received Power | SAPI Service Access Point Identifier | SDU Service Data Unit |
| RSRQ Reference Signal | | SEAF Security Anchor |

| | | |
|---|---|---|
| Received Quality | SCC Secondary | Function |
| RSSI Received Signal | Component Carrier, | SeNB secondary eNB |
| Strength Indicator | Secondary CC | SS-RSRP |
| RSU Road Side Unit | SMF Session | Synchronization |
| RSTD Reference Signal | Management Function | Signal based Reference |
| Time difference | SMS Short Message | Signal Received |
| SEPP Security Edge | Service | Power |
| Protection Proxy | SMSF SMS Function | SS-RSRQ |
| SFI Slot format | SMTC SSB-based | Synchronization |
| indication | Measurement Timing | Signal based Reference |
| SFTD Space-Frequency | Configuration | Signal Received |
| Time Diversity, SFN and | SN Secondary Node, | Quality |
| frame timing difference | Sequence Number | SS-SINR |
| SFN System Frame | SoC System on Chip | Synchronization |
| Number or | SON Self-Organizing | Signal based Signal to |
| Single Frequency | Network | Noise and Interference |
| Network | SpCell Special Cell | Ratio |
| SgNB Secondary gNB | SP-CSI-RNTI Semi- | SSS Secondary |
| SGSN Serving GPRS | Persistent CSI RNTI | Synchronization |
| Support Node | SPS Semi-Persistent | Signal |
| S-GW Serving Gateway | Scheduling | SSSG Search Space Set |
| SI System Information | SQN Sequence number | Group |
| SI-RNTI System | SR Scheduling Request | SSSIF Search Space Set |
| Information RNTI | SRB Signalling Radio | Indicator |
| SIB System Information | Bearer | SST Slice/Service Types |
| Block | SRS Sounding | SU-MIMO Single User |
| SIM Subscriber Identity | Reference Signal | MIMO |
| Module | SS Synchronization | SUL Supplementary |
| SIP Session Initiated | Signal | Uplink |
| Protocol | SSB SS Block | TA Timing Advance, |
| SiP System in Package | SSBRI SSB Resource | Tracking Area |
| SL Sidelink | Indicator | TAC Tracking Area |
| SLA Service Level | SSC Session and Service | Code |
| Agreement | Continuity | UDP User Datagram |
| SM Session | TPMI Transmitted | Protocol |
| Management | Precoding Matrix | UDR Unified Data |
| TAG Timing Advance | Indicator | Repository |
| Group | TR Technical Report | UDSF Unstructured Data |
| TAU Tracking Area | TRP, TRxP | Storage Network |
| Update | Transmission | Function |
| TB Transport Block | Reception Point | UICC Universal |
| TBS Transport Block | TRS Tracking Reference | Integrated Circuit Card |
| Size | Signal | UL Uplink |
| TBD To Be Defined | TRx Transceiver | UM Unacknowledged |
| TCI Transmission | TS Technical | Mode |
| Configuration Indicator | Specifications, | UML Unified Modelling |
| TCP Transmission | Technical Standard | Language |
| Communication | TTI Transmission Time | UMTS Universal Mobile |
| Protocol | Interval | Telecommunications |
| TDD Time Division | Tx Transmission, | System |
| Duplex | Transmitting, | UP User Plane |
| TDM Time Division | Transmitter | UPF User Plane |
| Multiplexing | U-RNTI UTRAN | Function |
| TDMA Time Division | Radio Network | URI Uniform Resource |
| Multiple Access | Temporary Identity | Identifier |
| TE Terminal | UART Universal | URL Uniform Resource |
| Equipment | Asynchronous | Locator |
| TEID Tunnel End Point | Receiver and | URLLC Ultra- |
| Identifier | Transmitter | Reliable and Low |
| TFT Traffic Flow | UCI Uplink Control | Latency |
| Template | Information | USB Universal Serial |
| TMSI Temporary Mobile | UE User Equipment | Bus |
| Subscriber Identity | UDM Unified Data | USIM Universal |
| TNL Transport Network | Management | Subscriber Identity Module |
| Layer | VLAN Virtual LAN, | VRB Virtual Resource |
| TPC Transmit Power | Virtual Local Area | Block |
| Control | Network | WiMAX Worldwide |
| USS UE-specific search | VM Virtual Machine | Interoperability for |
| space | VNF Virtualized | Microwave Access |
| UTRA UMTS Terrestrial | Network Function | WLAN Wireless Local |
| Radio Access | VNFFG VNF | Area Network |
| UTRAN Universal | Forwarding Graph | WMAN Wireless |
| Terrestrial Radio | VNFFGD VNF | Metropolitan Area |
| Access Network | Forwarding Graph | Network |

| | | |
|---|---|---|
| UwPTS Uplink Pilot Time Slot | Descriptor | WPAN Wireless Personal Area Network |
| V2I Vehicle-to-Infrastructure | VNFM VNF Manager | X2-C X2-Control plane |
| V2P Vehicle-to-Pedestrian | VoIP Voice-over-IP, Voice-over-Internet Protocol | X2-U X2-User plane |
| V2V Vehicle-to-Vehicle | VPLMN Visited Public Land Mobile Network | XML eXtensible Markup Language |
| V2X Vehicle-to-everything | VPN Virtual Private Network | XRES EXpected user RESponse |
| VIM Virtualized Infrastructure Manager | | XOR eXclusive OR |
| VL Virtual Link, | | ZC Zadoff-Chu |
| | | ZP Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. One or more non-transitory computer-readable media (NTCRM) having instructions, stored thereon, that when executed by one or more processors of a user equipment (UE) cause the UE to:
   receive configuration information to configure repetitions of a channel state information (CSI) report on a physical uplink shared channel (PUSCH), wherein the CSI report includes an aperiodic CSI (A-CSI) report or a semi-persistent CSI (SP-CSI) report;
   receive a downlink control information (DCI) to trigger the A-CSI report or activate the SP-CSI report; and
   encode, for transmission on the PUSCH, the CSI report with repetitions based on the configuration information and the DCI.

2. The one or more NTCRM of claim 1, wherein the configuration information indicates a number of the repetitions.

3. The one or more NTCRM of claim 2, wherein the number of repetitions is indicated separately from a number of repetitions of the PUSCH.

4. The one or more NTCRM of claim 1, wherein the configuration information is received via one or more of minimum system information (MSI), remaining minimum system information (RMSI), other system information (OSI), or dedicated radio resource control (RRC) signaling.

5. The one or more NTCRM of claim 1, wherein the configuration information is configured per DCI format.

6. The one or more NTCRM of claim 1, wherein the CSI report is the A-CSI report and is multiplexed on the PUSCH with a transport block, and wherein a number of the repetitions of the A-CSI is the same as a number of repetitions for the PUSCH.

7. One or more non-transitory computer-readable media (NTCRM) having instructions, stored thereon, that when executed by one or more processors of a next generation Node B (gNB) cause the gNB to:
   encode, for transmission to a user equipment (UE), configuration information to configure repetitions of a channel state information (CSI) report on a physical uplink shared channel (PUSCH), wherein the CSI report includes an aperiodic CSI (A-CSI) report or a semi-persistent CSI (SP-CSI) report;
   encode, for transmission to the UE, a downlink control information (DCI) to trigger the A-CSI report or activate the SP-CSI report; and
   receive, from the UE on the PUSCH, the CSI report with repetitions based on the configuration information and the DCI.

8. The one or more NTCRM of claim 7, wherein the configuration information indicates a number of the repetitions.

9. The one or more NTCRM of claim 8, wherein the number of repetitions is indicated separately from a number of repetitions of the PUSCH.

10. The one or more NTCRM of claim 7, wherein the configuration information is transmitted via one or more of minimum system information (MSI), remaining minimum system information (RMSI), other system information (OSI), or dedicated radio resource control (RRC) signaling.

11. The one or more NTCRM of claim 7, wherein the configuration information is configured per DCI format.

12. The one or more NTCRM of claim 7, wherein the CSI report is the A-CSI report and is multiplexed on the PUSCH with a transport block, and wherein a number of the repetitions of the A-CSI is the same as a number of repetitions for the PUSCH.

13. One or more non-transitory computer-readable media (NTCRM) having instructions, stored thereon, that when executed by one or more processors of a user equipment (UE) cause the UE to:
receive, from a gNodeB (gNB), configuration information to indicate a repetition window for a physical random access channel (PRACH), wherein the repetition window includes a plurality of PRACH occasions; and
encode a PRACH message for transmission with repetition in the respective PRACH occasions.

14. The one or more NTCRM of claim 13, wherein the configuration information indicates a starting position and a number of PRACH repetitions.

15. The one or more NTCRM of claim 13, wherein the configuration information is received via one or more of minimum system information (MSI), remaining minimum system information (RMSI), other system information (OSI), or dedicated radio resource control (RRC) signaling.

16. The one or more NTCRM of claim 13, wherein, to indicate the repetition window, the configuration information includes an offset and a periodicity, wherein the offset is a slot offset, a symbol offset, or a frame offset.

17. The one or more NTCRM of claim 13, wherein the configuration information includes an indication of whether the same beam or different beams are to be used for the repetitions of the PRACH message within the repetition window.

18. The one or more NTCRM of claim 13, wherein if the plurality of PRACH occasions in the repetition window associated with a same synchronization signal block (SSB) index are multiplexed in a frequency division multiplexing (FDM) manner, the PRACH message is transmitted in only one PRACH occasion of the repetition window.

19. The one or more NTCRM of claim 13, wherein the PRACH occasions for the repetitions are associated with a same synchronization signal block (SSB) for determination of transmit power, path loss, and reference signal received power.

20. The one or more NTCRM of claim 13, wherein the PRACH occasions for the repetitions are associated with different synchronization signal blocks (SSBs) for determination of transmit power, path loss, and reference signal received power.

* * * * *